US012621078B2

(12) United States Patent
Rudolf et al.

(10) Patent No.: US 12,621,078 B2
(45) Date of Patent: May 5, 2026

(54) METHOD AND APPARATUS FOR DOWNLINK AND UPLINK TRANSMISSION IN FULL-DUPLEX SYSTEMS

(71) Applicant: Samsung Electronics Co., Ltd., Suwon-si (KR)

(72) Inventors: Marian Rudolf, Longueuil (CA); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 18/353,780

(22) Filed: Jul. 17, 2023

(65) Prior Publication Data

US 2024/0039655 A1 Feb. 1, 2024

Related U.S. Application Data

(60) Provisional application No. 63/393,652, filed on Jul. 29, 2022, provisional application No. 63/393,425, filed on Jul. 29, 2022.

(51) Int. Cl.

| | |
|---|---|
| *H04L 5/14* | (2006.01) |
| *H04L 1/00* | (2006.01) |
| *H04L 5/00* | (2006.01) |
| *H04W 72/0446* | (2023.01) |
| *H04W 72/232* | (2023.01) |

(52) U.S. Cl.
CPC ............ *H04L 1/0003* (2013.01); *H04L 5/001* (2013.01); *H04L 5/14* (2013.01); *H04W 72/0446* (2013.01); *H04W 72/232* (2023.01)

(58) Field of Classification Search
CPC .................................. H04L 5/02; H04L 12/50
USPC .......................... 370/329, 401, 402, 403, 395
See application file for complete search history.

(56) References Cited

U.S. PATENT DOCUMENTS

| | | |
|---|---|---|
| 2017/0295593 A1 | 10/2017 | Kim et al. |
| 2018/0375697 A1 | 12/2018 | Chen et al. |
| 2019/0075492 A1 | 3/2019 | Suzuki et al. |

(Continued)

OTHER PUBLICATIONS

"3rd Generation Partnership Project; Technical Specification Group Radio Access Network; NR; Physical channels and modulation (Release 17)", 3GPP TS 38.211 V17.2.0, Jun. 2022, 136 pages.

(Continued)

*Primary Examiner* — Dang T Ton

(57) ABSTRACT

Methods and apparatuses for downlink and uplink transmissions in full-duplex systems. A method for operating a user equipment (UE) for receiving a physical downlink shared channel (PDSCH) includes receiving: first information for a first modulation and coding scheme (MCS) table associated with a first frequency-domain subband in a reception bandwidth on a cell, second information for a second MCS table associated with a second frequency-domain subband in the reception bandwidth, and third information for a condition. At least one of the first and second frequency-domain subbands is one of a subband full-duplex (SBFD) downlink (DL) subband, an SBFD flexible subband, or an SBFD uplink (UL) subband. The method further includes determining whether the condition is valid for reception in a slot or symbol and receiving the PDSCH in the slot or symbol based on the first MCS table when valid and the second MCS table when not valid.

18 Claims, 15 Drawing Sheets

(56) References Cited

U.S. PATENT DOCUMENTS

| | | |
|---|---|---|
| 2021/0345374 A1 | 11/2021 | Abotabl et al. |
| 2022/0104245 A1 | 3/2022 | Xu et al. |
| 2022/0110146 A1 | 4/2022 | Xu et al. |
| 2025/0055660 A1* | 2/2025 | Rudolf .................. H04L 5/0035 |

OTHER PUBLICATIONS

"3rd Generation Partnership Project; Technical Specification Group Radio Access Network; NR; Multiplexing and channel coding (Release 17)", 3GPP TS 38.212 V17.2.0, Jun. 2022, 201 pages.

"3rd Generation Partnership Project; Technical Specification Group Radio Access Network; NR; Physical layer procedures for control (Release 17)", 3GPP TS 38.213 V17.2.0, Jun. 2022, 256 pages.

"3rd Generation Partnership Project; Technical Specification Group Radio Access Network; NR; Physical layer procedures for data (Release 17)," 3GPP TS 38.214 V17.2.0 , Jun. 2022, 228 pages.

"5G; NR; Medium Access Control (MAC) protocol specification (3GPP TS 38.321 version 17.1.0 Release 17)", ETSI TS 138 321 V17.1.0 , Aug. 2022, 244 pages.

"5G; NR; Radio Resource Control (RRC); Protocol specification (3GPP TS 38.331 version 17.1.0 Release 17)", ETSI TS 138 331 V17.1.0, Aug. 2022, 1257 pages.

"5G; NR; User Equipment (UE) radio access capabilities (3GPP TS 38.306 version 17.1.0 Release 17)", ETSI TS 138 306 V17.1.0, Aug. 2022, 226 pages.

"3rd Generation Partnership Project; Technical Specification Group Radio Access Network; NR; Requirements for support of radio resource management (Release 17)", 3GPP TS 38.133 V17.1.0, Mar. 2021, 2172 pages.

International Search Report and Written Opinion issued Oct. 31, 2023 regarding International Application No. PCT/KR2023/ 010980, 7 pages.

Extended European Search Report issued Sep. 29, 2025 regarding Application No. 23847030.6, 11 pages.

* cited by examiner

600

TDD

700

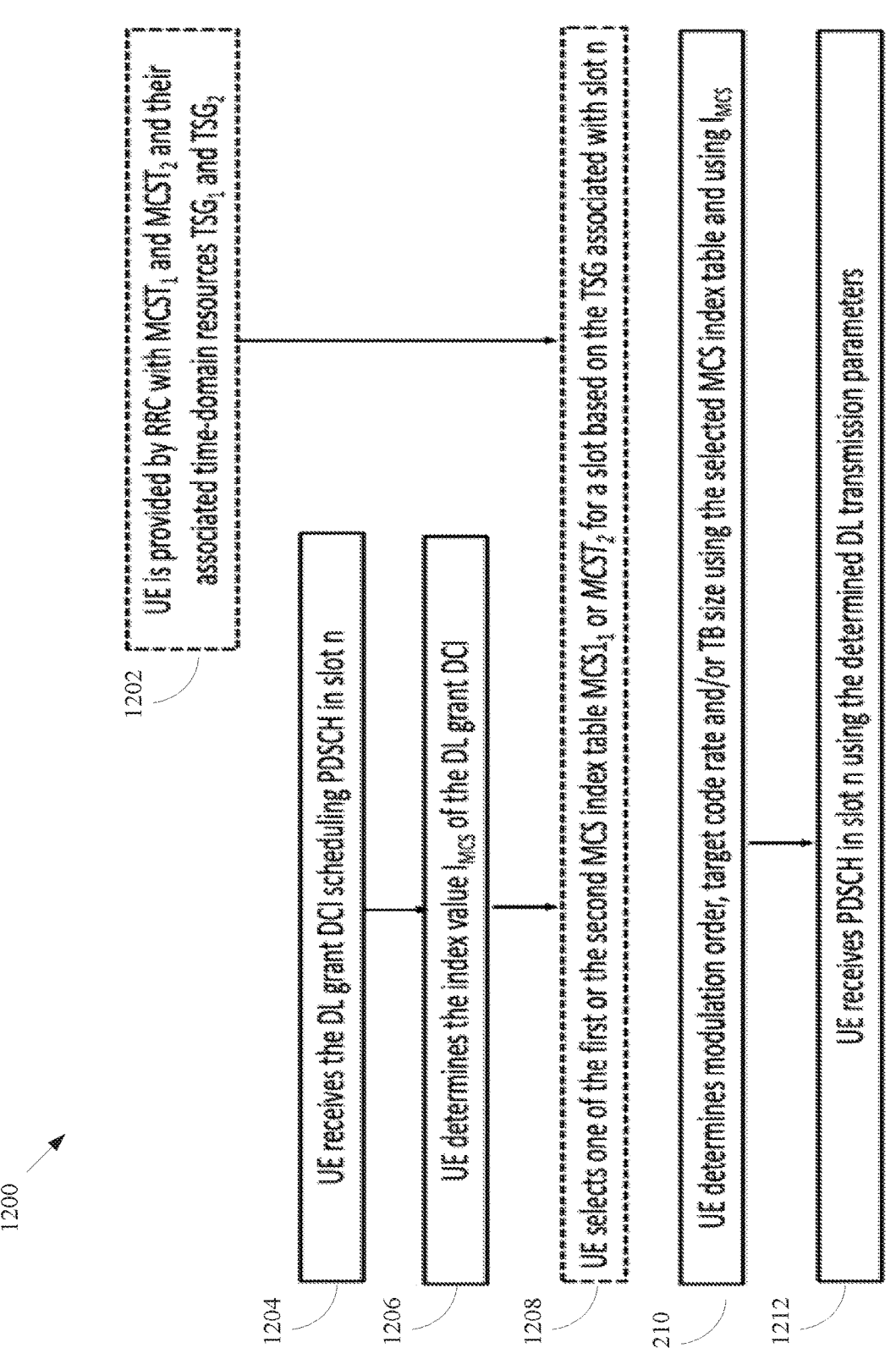

1200

1202 — UE is provided by RRC with $MCST_1$ and $MCST_2$ and their associated time-domain resources $TSG_1$ and $TSG_2$ 1204 — UE receives the DL grant DCI scheduling PDSCH in slot n 1206 — UE determines the index value $I_{MCS}$ of the DL grant DCI 1208 — UE selects one of the first or the second MCS index table $MCS1_1$ or $MCST_2$ for a slot based on the TSG associated with slot n 1210 — UE determines modulation order, target code rate and/or TB size using the selected MCS index table and using $I_{MCS}$ 1212 — UE receives PDSCH in slot n using the determined DL transmission parameters

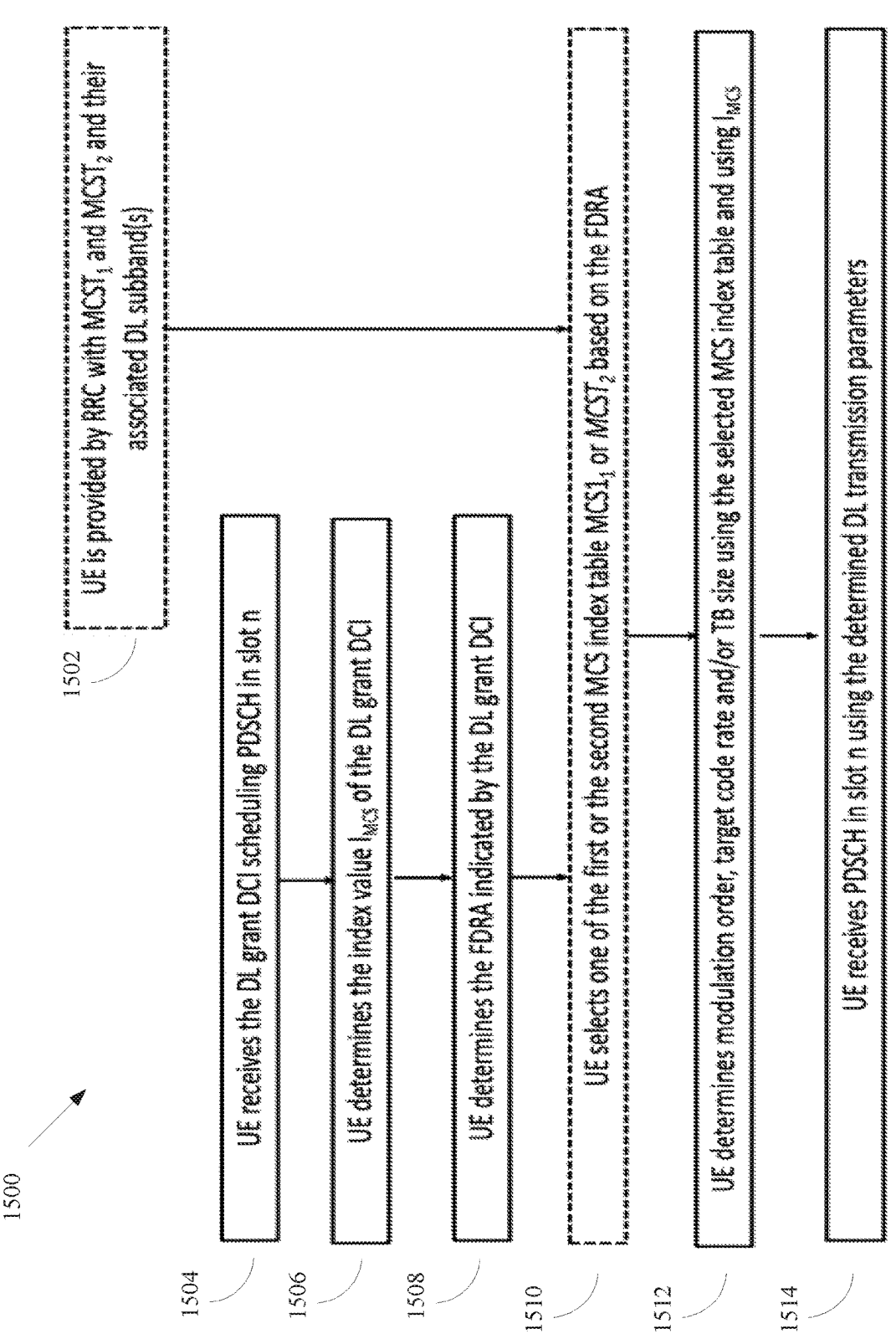

1500

1502 — UE is provided by RRC with $MCST_1$ and $MCST_2$ and their associated DL subband(s)

1504 — UE receives the DL grant DCI scheduling PDSCH in slot n

1506 — UE determines the index value $I_{MCS}$ of the DL grant DCI

1508 — UE determines the FDRA indicated by the DL grant DCI

1510 — UE selects one of the first or the second MCS index table $MCS1_1$ or $MCST_2$ based on the FDRA 1512 — UE determines modulation order, target code rate and/or TB size using the selected MCS index table and using $I_{MCS}$ 1514 — UE receives PDSCH in slot n using the determined DL transmission parameters

FIG. 15

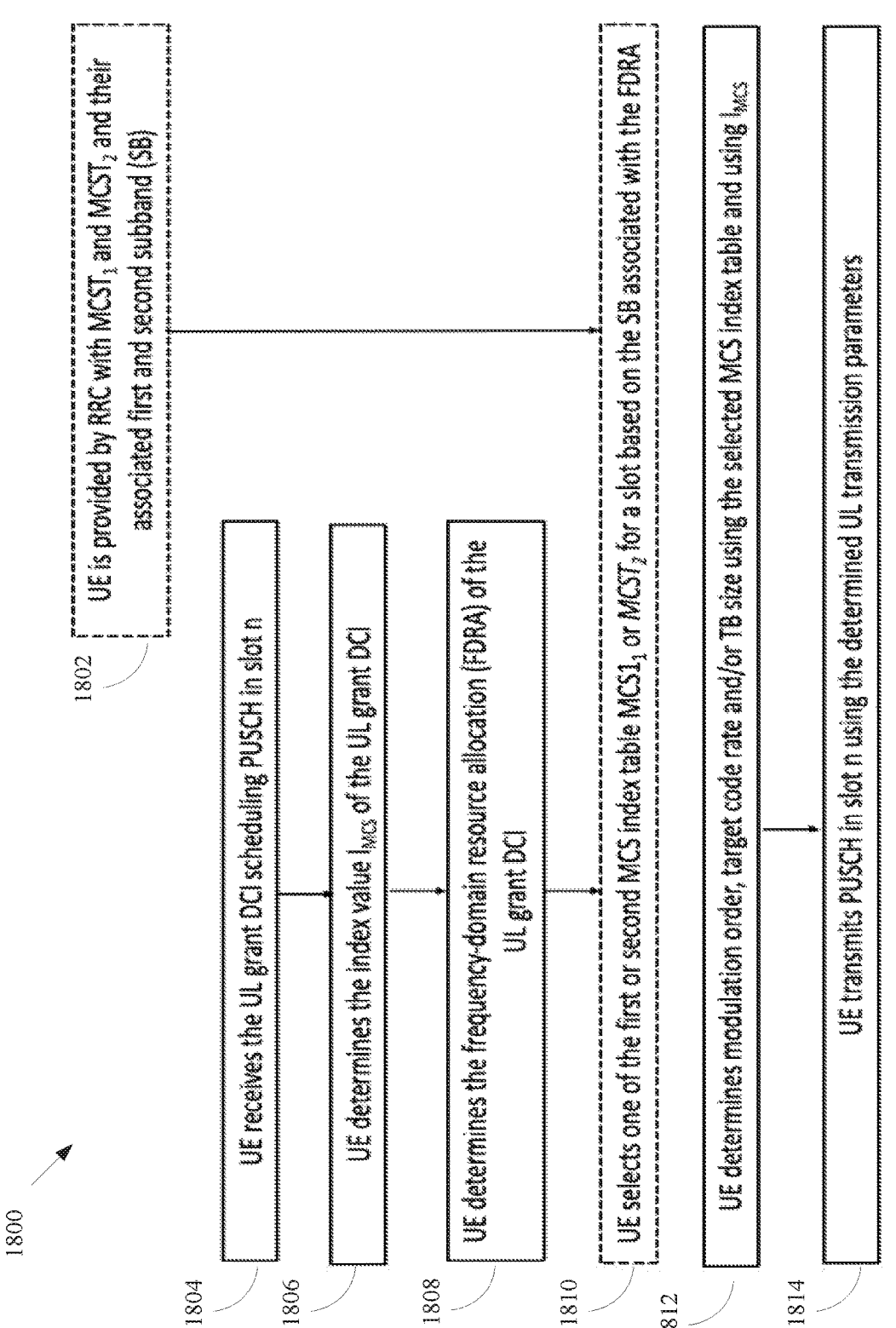

1800

1802    UE is provided by RRC with MCST₁ and MCST₂ and their associated first and second subband (SB)

1804    UE receives the UL grant DCI scheduling PUSCH in slot n

1806    UE determines the index value I_MCS of the UL grant DCI

1808    UE determines the frequency-domain resource allocation (FDRA) of the UL grant DCI 1810    UE selects one of the first or second MCS index table MCS1₁ or MCST₂ for a slot based on the SB associated with the FDRA 1812    UE determines modulation order, target code rate and/or TB size using the selected MCS index table and using I_MCS 1814    UE transmits PUSCH in slot n using the determined UL transmission parameters

FIG. 18

METHOD AND APPARATUS FOR DOWNLINK AND UPLINK TRANSMISSION IN FULL-DUPLEX SYSTEMS

CROSS-REFERENCE TO RELATED APPLICATIONS AND CLAIM OF PRIORITY

The present application claims priority to U.S. Provisional Patent Application No. 63/393,652, filed on Jul. 29, 2023, and U.S. Provisional Patent Application No. 63/393,425, filed on Jul. 29, 2023. The contents of the above-identified patent documents are incorporated herein by reference.

TECHNICAL FIELD

The present disclosure relates generally to wireless communication systems and, more specifically, the present disclosure relates to downlink (DL) and uplink (UL) transmissions in full-duplex systems.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to DL and UL transmissions in full-duplex systems.

In one embodiment, a method for operating a user equipment (UE) for receiving a physical downlink shared channel (PDSCH) is provided. The method includes receiving: first information for a first modulation and coding scheme (MCS) table associated with a first frequency-domain subband in a reception bandwidth on a cell, second information for a second MCS table associated with a second frequency-domain subband in the reception bandwidth on the cell, and third information for a condition. At least one of the first frequency-domain subband and the second frequency-domain subband is one of a first subband full-duplex (SBFD) DL subband, a second SBFD DL subband, an SBFD flexible subband, or an SBFD UL subband. The method further includes determining whether the condition is valid for reception in a slot or symbol and receiving the PDSCH in the slot or symbol based on the first MCS table when the condition is valid and the second MCS table when the condition is not valid.

In another embodiment, a base station is provided. The base station includes a transceiver configured to transmit: first information for a first MCS table associated with a first frequency-domain subband in a transmission bandwidth on a cell, second information for a second MCS table associated with a second frequency-domain subband in the transmission bandwidth on the cell, and third information for a condition. At least one of the first frequency-domain subband and the second frequency-domain subband is one of a first SBFD DL subband, a second SBFD DL subband, an SBFD flexible subband, or an SBFD UL subband. The base station further includes a processor operably coupled to the transceiver. The processor is configured to determine whether the condition is valid for transmission in a slot or symbol. The transceiver is further configured to transmit receive a PDSCH in the slot or symbol based on the first MCS table when the condition is valid and the second MCS table when the condition is not valid.

In yet another embodiment, a user equipment (UE) is provided. The UE includes a transceiver configured to receive: first information for a first MCS table associated with a first frequency-domain subband in a reception bandwidth on a cell, second information for a second MCS table associated with a second frequency-domain subband in the reception bandwidth on the cell, and third information for a condition. At least one of the first frequency-domain subband and the second frequency-domain subband is one of a first SBFD DL subband, a second SBFD DL subband, an SBFD flexible subband, or an SBFD UL subband. The UE further includes a processor operably coupled to the transceiver. The processor is configured to determine whether the condition is valid for reception in a slot or symbol. The transceiver is further configured to receive a PDSCH in the slot or symbol based on the first MCS table when the condition is valid and the second MCS table when the condition is not valid.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 illustrates a flowchart of UE operation for PDSCH transmission according to embodiments of the present disclosure;

FIG. 15 illustrates a flowchart of UE operation for PDSCH reception according to embodiments of the present disclosure;

FIG. 18 illustrates a flowchart of UE operation for PDSCH transmission according to embodiments of the present disclosure.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v 17.2.0, "NR; Physical channels and modulation"; 3GPP TS 38.212 v 17.2.0, "NR; Multiplexing and Channel coding"; 3GPP TS 38.213 v 17.2.0, "NR; Physical Layer Procedures for Control"; 3GPP TS 38.214 v 17.2.0, "NR; Physical Layer Procedures for Data"; 3GPP TS 38.321 v 17.1.0, "NR; Medium Access Control (MAC) protocol specification," 3GPP TS 38.331 v 17.1.0, "NR; Radio Resource Control (RRC) Protocol Specification"; 3GPP TS 38.306 v 17.1.0, "NR; User Equipment (UE) radio access capabilities"; and 3GPP TS 38.133 v 17.1.0, "NR; Requirements for support of radio resource management."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
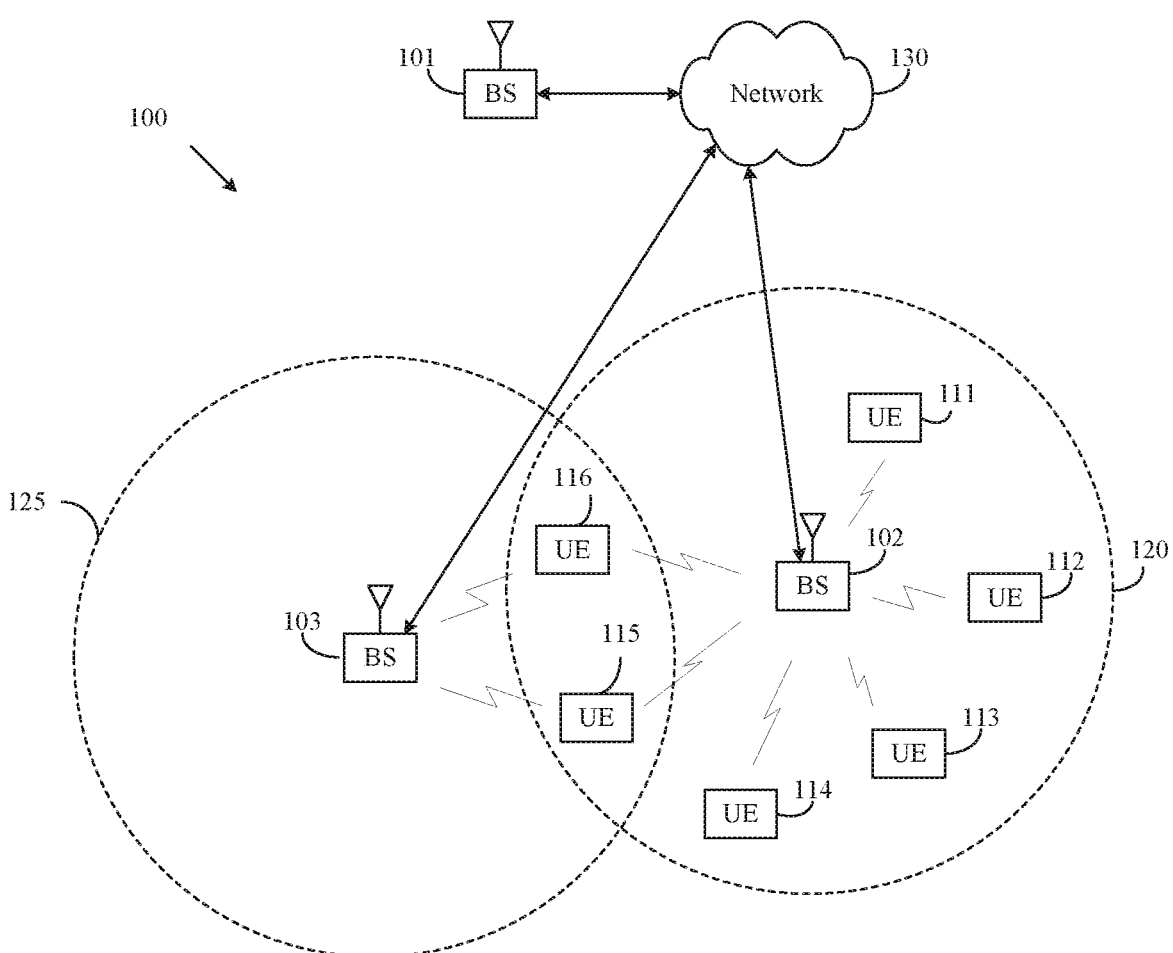
FIG. 1 illustrates an example of wireless network according to embodiments of the present disclosure.
Figure 2:
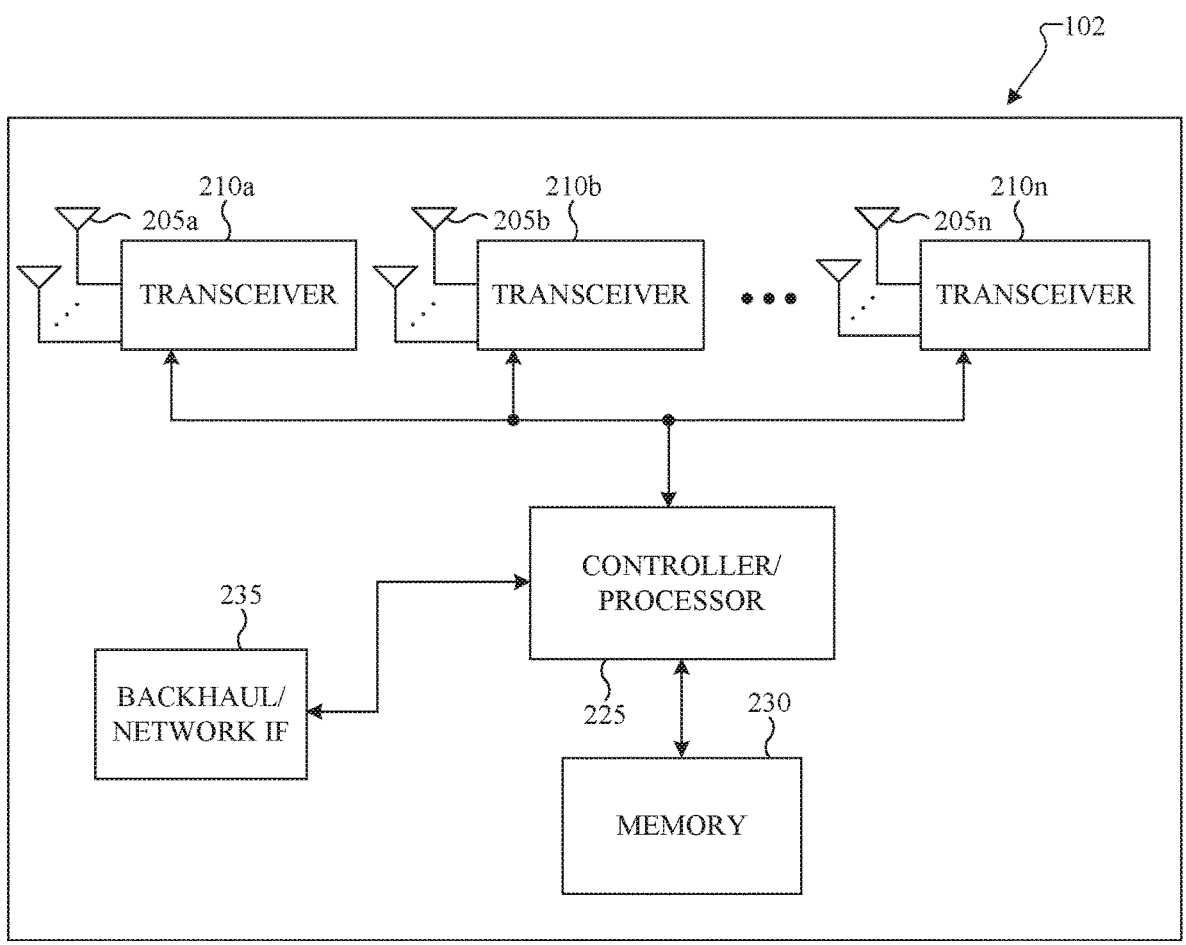
FIG. 2 illustrates an example of gNB according to embodiments of the present disclosure.
Figure 3:
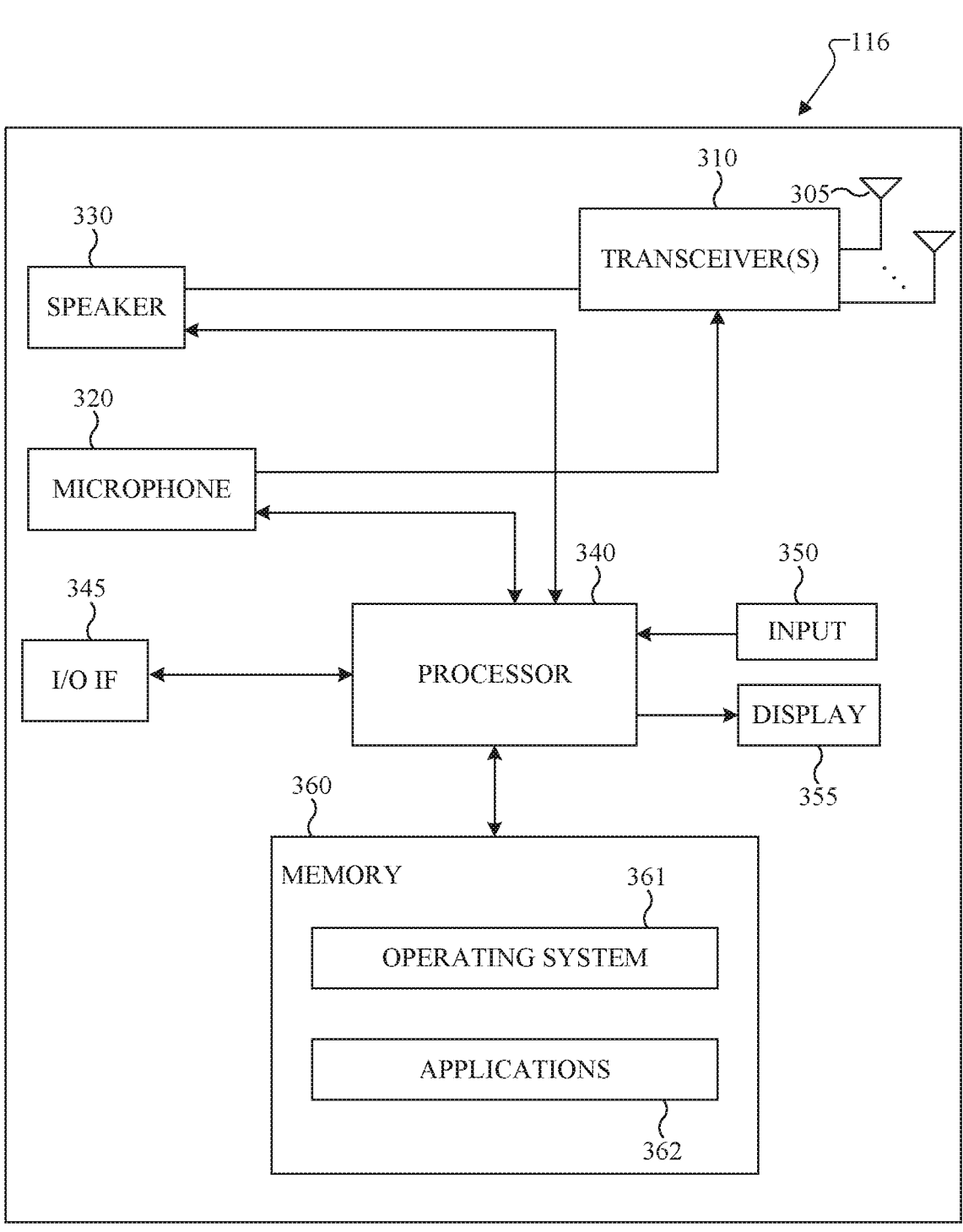
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3 rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for UL transmissions in full-duplex systems. In certain embodiments, and one or more of the gNBs 101-103 includes circuitry, programing, or a combination thereof, for DL transmissions in full-duplex systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction.

Any of a wide variety of other functions could be supported in the gNB 102 by the controller/processor 225.

The controller/processor 225 is also capable of executing programs and other processes resident in the memory 230, such as processes for DL transmissions in full-duplex systems. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for UL transmissions in full-duplex systems. The processor 340 can move data into or out of the memory 360 as required by an executing process. In some embodiments, the processor 340 is configured to execute the applications 362 based on the OS 361 or in response to signals received from gNB s or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355*m* which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
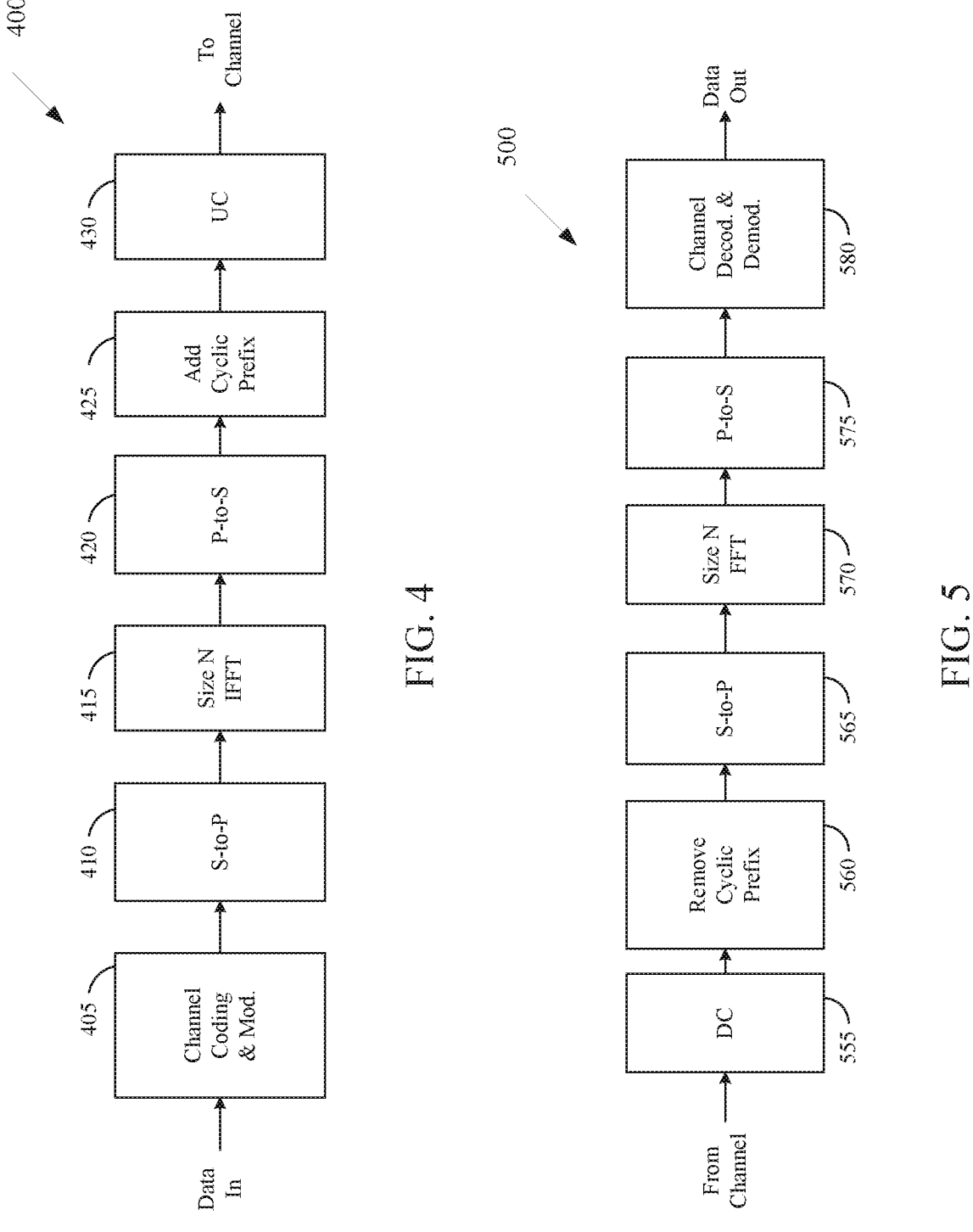
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support reception of downlink or uplink transmissions in full-duplex systems.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In one embodiment, UL signals also include data signals conveying information content, control signals conveying UL control information (UCI), DM-RS associated with data or UCI demodulation, sounding RS (SRS) enabling a gNB to perform UL channel measurement, and a RA preamble enabling a UE to perform RA. A UE transmits data information or UCI through a respective PUSCH or a physical UL control channel (PUCCH). A PUSCH or a PUCCH can be transmitted over a variable number of slot symbols including one slot symbol. The gNB can configure the UE to transmit signals on a cell within an active UL bandwidth part (BWP) of the cell UL BW.

UCI includes HARQ acknowledgement (ACK) information, indicating correct or incorrect detection of data transport blocks (TB s) in a PDSCH, scheduling request (SR) indicating whether a UE has data in a buffer, and CSI reports enabling a gNB to select appropriate parameters for PDSCH or physical downlink control channel (PDCCH) transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER (see NR specification), of a precoding matrix indicator (PMI) informing a gNB how to combine signals from multiple transmitter antennas in accordance with a MIMO transmission principle, and of a rank indicator (RI) indicating a transmission rank for a PDSCH.

UL RS includes DM-RS and SRS. DM-RS is transmitted only in a BW of a respective PUSCH or PUCCH transmission. A gNB can use a DM-RS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel (PRACH as shown in NR specifications).

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a physical broadcast channel (PBCH), the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE (such as the UE 116) may assume that synchronization signal (SS)/PBCH block (also denoted as SSBs) transmitted with the same block index on the same center frequency location are quasi co-located with respect to Doppler spread, Doppler shift, average gain, average delay, delay spread, and, when applicable, spatial Rx parameters. The UE may not assume quasi co-location for any other synchronization signal SS/PBCH block transmissions.

In absence of CSI-RS configuration, and unless otherwise configured, the UE may assume PDSCH DM-RS and SSB to be quasi co-located with respect to Doppler shift, Doppler spread, average delay, delay spread, and, when applicable, spatial Rx parameters. The UE may assume that the PDSCH DM-RS within the same code division multiplexing (CDM) group is quasi co-located with respect to Doppler shift, Doppler spread, average delay, delay spread, and spatial Rx. The UE may also assume that DM-RS ports associated with a PDSCH are QCL with QCL type A, type D (when applicable) and average gain. The UE may further assume that no DM-RS collides with the SS/PBCH block.

The UE can be configured with a list of up to M transmission configuration indication (TCI) State configurations within the higher layer parameter PDSCH-Config to decode PDSCH according to a detected PDCCH with DCI intended for the UE and the given serving cell, where M depends on the UE capability maxNumberConfiguredTCI-statesPerCC. Each TCI-State contains parameters for configuring a quasi-colocation (QCL) relationship between one or two downlink reference signals and the DM-RS ports of the PDSCH, the DM-RS port of PDCCH or the CSI-RS port(s) of a CSI-RS resource.

The quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values: QCL-TypeA: {Doppler shift, Doppler spread, average delay, delay spread}; QCL-TypeB: {Doppler shift, Doppler spread; QCL-TypeC: {Doppler shift, average delay}; and QCL-TypeD: {Spatial Rx parameter}.

The UE receives a MAC-CE activation command to map up to {N} (e.g., N=8) TCI states to the codepoints of the DCI field "transmission configuration indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot $$\left(n + 3N_{slot}^{subframe,\mu}\right).$$

In the present disclosure, various embodiments of the disclosure may be also implemented in any type of UE including, for example, UEs with the same, similar, or more capabilities compared to legacy 5G NR UEs. Although various embodiments of the disclosure discuss 3GPP 5G NR communication systems, the embodiments may apply in general to UEs operating with other RATs and/or standards, such as next releases/generations of 3GPP, IEEE WiFi, and so on.

In the present disclosure, unless otherwise explicitly noted, providing a parameter value by higher layers includes providing the parameter value by a system information block (SIB), such as a SIB1, or by a common RRC signaling, or by UE-specific RRC signaling.

In the present disclosure, for brevity of description, the higher layer provided TDD UL-DL frame configuration refers to tdd-UL-DL-ConfigurationCommon as example for RRC common configuration and/or tdd-UL-DL-ConfigurationDedicated as example for UE-specific configuration. The UE determines a common TDD UL-DL frame configuration of a serving cell by receiving a SIB such as a SIB1 when accessing the cell from RRC_IDLE or by RRC signaling when the UE is configured with SCells or additional SCGs by an IE ServingCellConfigCommon in RRC_CONNECTED. The UE determines a dedicated TDD UL-DL frame configuration using the IE ServingCell-Config when the UE is configured with a serving cell, e.g., add or modify, where the serving cell may be the SpCell or an SCell of an MCG or SCG. A TDD UL-DL frame configuration designates a slot or symbol as one of types "D," "U" or "F" using at least one time-domain pattern with configurable periodicity.

In the present disclosure, for brevity of description, SFI refers to a slot format indicator as example that is indicated using higher layer provided IEs such as slotFormatCombination or slotFormatCombinationsPerCell and which is indicated to the UE by group common DCI format such as DCI F2_0 where slotFormats are defined in 3GPP standard specification.

In the present disclosure, for brevity of description, the term xdd-config is used to describe the configuration and parameterization for UE determination of receptions and/or transmissions in a serving cell supporting full-duplex operation. It is not necessary that the use of full-duplex operation by a gNB in the serving cell when scheduling to a UE receptions and/or transmissions in a slot or symbol is identifiable by or known to the UE. For example, parameters associated with the xdd-config may include a set of time-domain resources, e.g., symbols/slots, where receptions or transmissions by the UE are allowed, possible, or disallowed; a range or a set of frequency-domain resources, e.g., serving cells, BWPs, start and/or end or a set of RBs, where receptions or transmissions by the UE are allowed, possible, or disallowed; one or multiple guard intervals for time and/or frequency domain radio resources during receptions or transmissions by the UE, e.g., guard SCs or RBs, guard symbols; one or multiple resource types, e.g., "simultaneous Tx-Rx," "Rx only," or "Tx only" or "D," "U," "F," "N/A"; one or multiple scheduling behaviors, e.g., "DG only," "CG only," "any."

Parameters associated with the xdd-config may include indications or values to determine Tx power settings of receptions by the UE, such as, reference power, energy per resource element (EPRE), or power offset of a designated channel/or signal type transmitted by a serving gNB; to determine the power and/or spatial settings for transmissions by the UE. Configuration and/or parameters associated with the xdd-config may be provided to the UE using higher layer signaling, DCI-based signaling, and/or MAC CE based signaling. For example, parameters associated with xdd-config may be provided to the UE by means of common RRC signaling using SIB or by UE-dedicated RRC signaling such as ServingCellConfig. For example, parameters associated with xdd-config may be provided to the UE using an RRC-configured TDRA table, or a PUCCH configuration, and/or DCI-based signaling that indicates to the UE a configuration for the UE to apply.

In some embodiments, 5G NR radio supports time-division duplex (TDD) operation and frequency division duplex (FDD) operation. Use of FDD or TDD depends on the NR frequency band and per-country allocations. TDD is required in most bands above 2.5 GHz.

Figure 6:
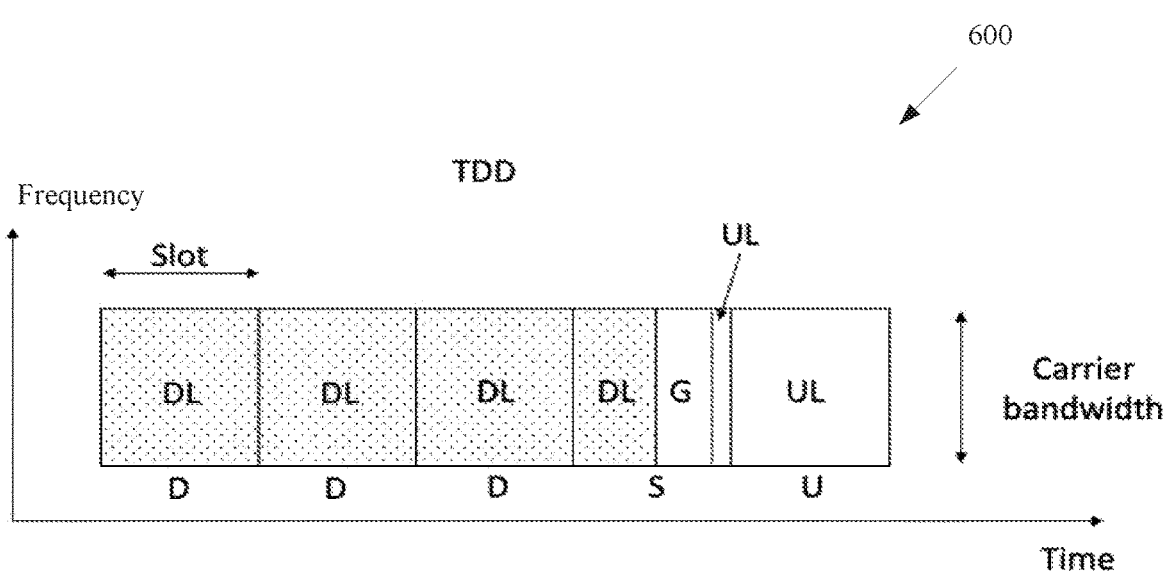
FIG. 6 illustrates an example of time division duplex (TDD) communication system configuration according to embodiments of the present disclosure.

FIG. 6 illustrates an example of TDD communication system configuration 600 according to embodiments of the present disclosure. An embodiment of the TDD communication system configuration 600 shown in FIG. 6 is for illustration only.

A DDDSU UL-DL configuration is shown in FIG. 6. Here, D denotes a DL slot, U denotes an UL slot, and S denotes a special or switching slot with a DL part, a flexible part that can also be used as guard period G for DL-to-UL switching, and optionally an UL part.

TDD has a number of advantages over FDD. For example, use of the same band for DL and UL transmissions leads to simpler UE implementation with TDD because a duplexer is not required. Another advantage is that time resources can be flexibly assigned to UL and DL considering an asymmetric ratio of traffic in both directions. DL is typically assigned most time resources in TDD to handle DL-heavy mobile traffic. Another advantage is that CSI can be more easily acquired via channel reciprocity. This reduces an overhead associated with CSI reports especially when there is a large number of antennas.

Although there are advantages of TDD over FDD, there are also disadvantages. A first disadvantage is a smaller coverage of TDD due to the smaller portion of time resources available for transmissions from a UE, while with FDD all time resources can be used. Another disadvantage is latency. In TDD, a timing gap between reception by a UE and transmission from a UE containing the hybrid automatic repeat request acknowledgement (HARQ-ACK) information associated with receptions by the UE is typically larger than that in FDD, for example by several milliseconds.

Therefore, the HARQ round trip time in TDD is typically longer than that with FDD, especially when the DL traffic load is high. This causes increased UL user plane latency in TDD and can cause data throughput loss or even HARQ stalling when a PUCCH providing HARQ-ACK information needs to be transmitted with repetitions in order to improve coverage (an alternative in such case is for a network to forgo HARQ-ACK information at least for some transport blocks in the DL).

To address some of the disadvantages for TDD operation, an adaptation of link direction based on physical layer signaling using a DCI format is supported where, with the exception of some symbols in some slots supporting predetermined transmissions such as for SSB s, symbols of a slot can have a flexible direction (UL or DL) that a UE can determine according to scheduling information for transmissions or receptions. A PDCCH can also be used to provide a DCI format, such as a DCI format 2_0 as described in 3GPP standard specification, that can indicate a link direction of some flexible symbols in one or more slots. Nevertheless, in actual deployments, it is difficult for a gNB scheduler to adapt a transmission direction of symbols without coordination with other gNB schedulers in the network. This is because of CLI where, for example, DL receptions in a cell by a UE can experience large interference from UL transmissions in the same or neighboring cells from other UEs.

FD communications offer a potential for increased spectral efficiency, improved capacity, and reduced latency in wireless networks. When using FD communications, a gNB or a UE simultaneously receives and transmits on fully or partially overlapping, or adjacent, frequency resources, thereby improving spectral efficiency and reducing latency in user and/or control planes.

There are several options for operating a FD wireless communication system. For example, a single carrier may be used such that transmissions and receptions are scheduled on same time-domain resources, such as symbols or slots. Transmissions and receptions on same symbols or slots may be separated in frequency, for example by being placed in non-overlapping sub-bands. An UL frequency sub-band, in time-domain resources that also include DL frequency sub-bands, may be located in the center of a carrier, or at the edge of the carrier, or at a selected frequency-domain position of the carrier. The allocations of DL sub-bands and UL sub-bands may also partially or even fully overlap. A gNB may simultaneously transmit and receive in time-domain resources using same physical antennas, antenna ports, antenna panels and transmitter-receiver units (TRX). Transmission and reception in FD may also occur using separate physical antennas, ports, panels, or TRXs. Antennas, ports, panels, or TRXs may also be partially reused, or only respective subsets can be active for transmissions and receptions when FD communication is enabled.

Instead of using a single carrier, it is also possible to use different component carriers (CCs) for receptions and transmissions by a UE. For example, receptions by a UE can occur on a first CC and transmissions by the UE occur on a second CC having a small, including zero, frequency separation from the first CC.

Furthermore, a gNB can operate with FD mode even when a UE still operates in half-duplex mode, such as when the UE can either transmit and receive at a same time, or the UE can also be capable for FD operation.

FD transmission/reception is not limited to gNBs, TRPs, or UEs, but can also be used for other types of wireless nodes such as relay or repeater nodes.

A full duplex operation needs to overcome several challenges in order to be functional in actual deployments. When using overlapping frequency resources, received signals are subject to co-channel CLI and self-interference. CLI and self-interference cancellation methods include passive methods that rely on isolation between transmit and receive antennas, active methods that utilize RF or digital signal processing, and hybrid methods that use a combination of active and passive methods. Filtering and interference cancellation may be implemented in RF, baseband (BB), or in both RF and BB. While mitigating co-channel CLI may require large complexity at a receiver, it is feasible within current technological limits. Another aspect of FD operation is the mitigation of adjacent channel CLI because in several cellular band allocations, different operators have adjacent spectrum.

In the present disclosure, the term full-duplex (FD) is used as a short form for a full-duplex operation in a wireless system. The terms cross-division-duplex (XDD), full-duplex (FD) and subband full-duplex (SBFD) may be used interchangeably in the disclosure.

An FD operation in NR can improve spectral efficiency, link robustness, capacity, and latency of UL transmissions. In an NR TDD system, transmissions from a UE are limited by fewer available transmission opportunities than receptions by the UE. For example, for NR TDD with SCS=30 kHz, DDDU (2 msec), DDDSU (2.5 msec), or DDDDDDD-SUU (5 msec), the UL-DL configurations allow for an DL:UL ratio from 3:1 to 4:1. Any transmission from the UE can only occur in a limited number of UL slots, for example every 2, 2.5, or 5 msec, respectively.

Figure 7:
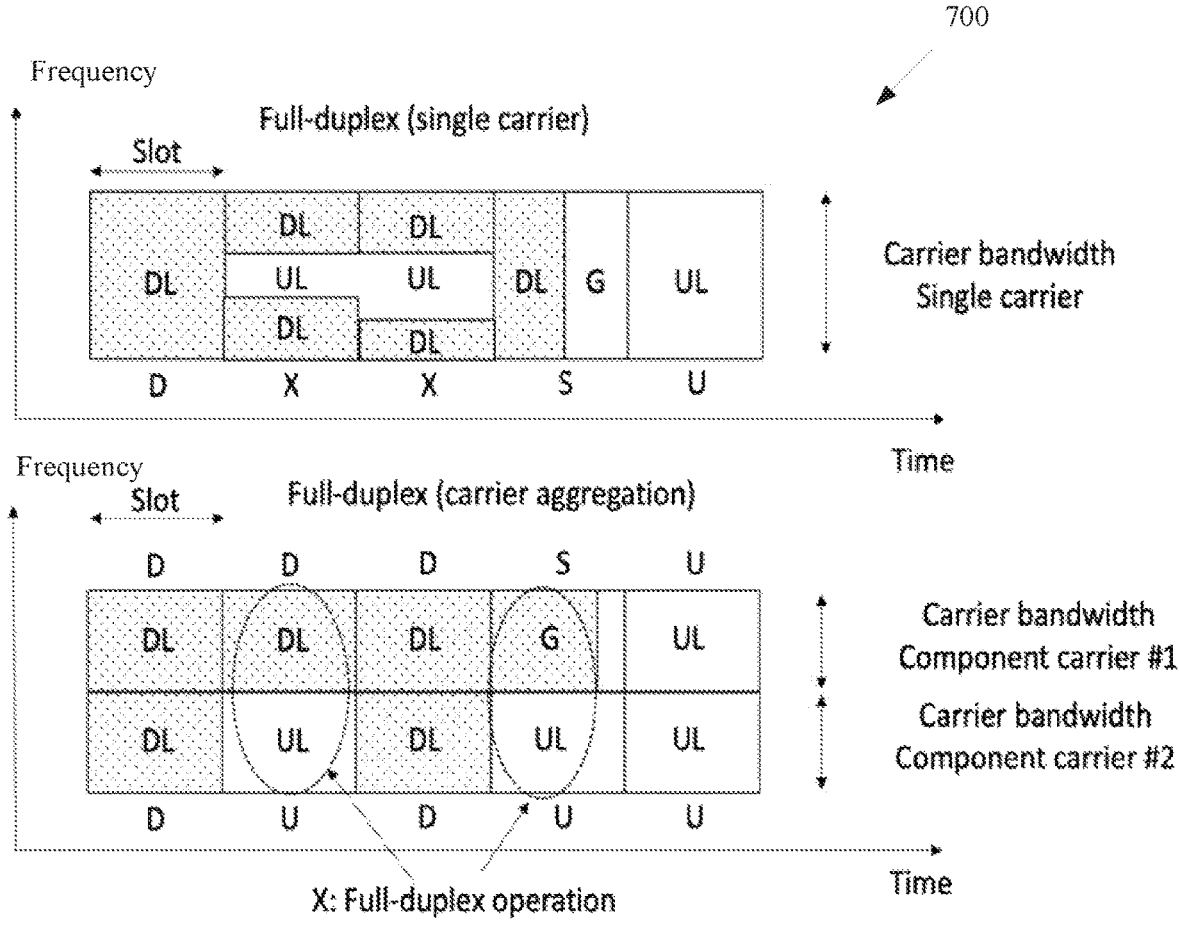
FIG. 7 illustrates an example of full-duplex communication system configurations according to embodiments of the present disclosure.

FIG. 7 illustrates an example of full-duplex communication system configurations 700 according to embodiments of the present disclosure. An embodiment of the full-duplex communication system configurations 700 shown in FIG. 7 is for illustration only.

For a single carrier TDD configuration with FD enabled, slots denoted as X are FD slots. Both DL and UL transmissions can be scheduled in FD slots for at least one or more symbols. The term FD slot is used to refer to a slot where UEs can simultaneously receive and transmit in at least one or more symbols of the slot if scheduled or assigned radio resources by the base station. A half-duplex UE cannot transmit and receive simultaneously in a FD slot or on a symbol of a FD slot. When a half-duplex UE is configured for transmission in symbols of a FD slot, another UE can be configured for reception in the symbols of the FD slot. A FD UE can transmit and receive simultaneously in symbols of a FD slot, possibly in presence of other UEs with resources for either receptions or transmissions in the symbols of the FD slot. Transmissions by a UE in a first FD slot can use same or different frequency-domain resources than in a second FD slot, wherein the resources can differ in bandwidth, a first RB, or a location of the center carrier.

When a UE receives signals/channels from a gNB in a full-duplex slot, the receptions may be scheduled in a DL subband of the full-duplex slot. When full-duplex operation at the gNB uses DL slots for scheduling transmissions from the UE using full-duplex transmission and reception at the gNB, there may be one or multiple, such as two, DL subbands in the full-duplex slot. When a UE is scheduled to transmit in a full-duplex slot, the transmission may be scheduled in an UL subband of the full-duplex slot. When full-duplex operation at the gNB uses UL slots for purpose of scheduling transmissions to UEs using full-duplex transmission and reception at the gNB, there may be one or multiple, such as two, UL subbands in the full-duplex slot.

For example, when full-duplex operation at the gNB uses a DL or F slot or symbol for scheduling transmissions from the UE using full-duplex transmission and reception at the gNB, there may be one DL subband on the full-duplex slot or symbol and one UL subband of the full-duplex slot or symbol in the NR carrier. A frequency-domain configuration of the DL and UL subbands may then be referred to as 'DU' or 'LID', respectively, depending on whether the UL subband is configured/indicated in the upper or the lower part of the NR carrier. In another example, when full-duplex operation at the gNB uses a DL or F slot or symbol for scheduling transmissions from the UE using full-duplex transmission and reception at the gNB, there may be two, DL subbands and one UL subband on the full-duplex slot or symbol. A frequency-domain configuration of the DL and UL subbands may then be referred to as 'DUD' when the UL subband is configured/indicated in a part of the NR carrier and the DL subbands are configured/indicated at the edges of the NR carrier, respectively.

In the following, for brevity, full-duplex slots/symbols and SBFD slots/symbols may be referred to as SBFD slots/symbol and non-full-duplex slots/symbols and normal DL or UL slot/symbols may be referred to as non-SBFD slots/symbols.

For a carrier aggregation TDD configuration with FD enabled, a UE receives in a slot on CC #1 and transmits in at least one or more symbols of the slot on CC #2. In addition to D slots used only for transmissions/receptions by a gNB/UE, U slots used only for receptions/transmissions by the gNB/UE, and S slots that are used for both transmission and receptions by the gNB/UE and also support DL-UL switching, FD slots with both transmissions/receptions by a gNB or a UE that occur on same time-domain resources, such as slots or symbols, are labeled by X. For the example of TDD with SCS=30 kHz, single carrier, and UL-DL allocation DXXSU (2.5 msec), the second and third slots allow for FD operation. Transmissions from a UE can also occur in a last slot (U) where the full UL transmission bandwidth is available. FD slots or symbol assignments over a time period/number of slots can be indicated by a DCI format in a PDCCH reception and can then vary per unit of the time period, or can be indicated by higher layer signaling, such as via a MAC CE or RRC.

Figure 8:
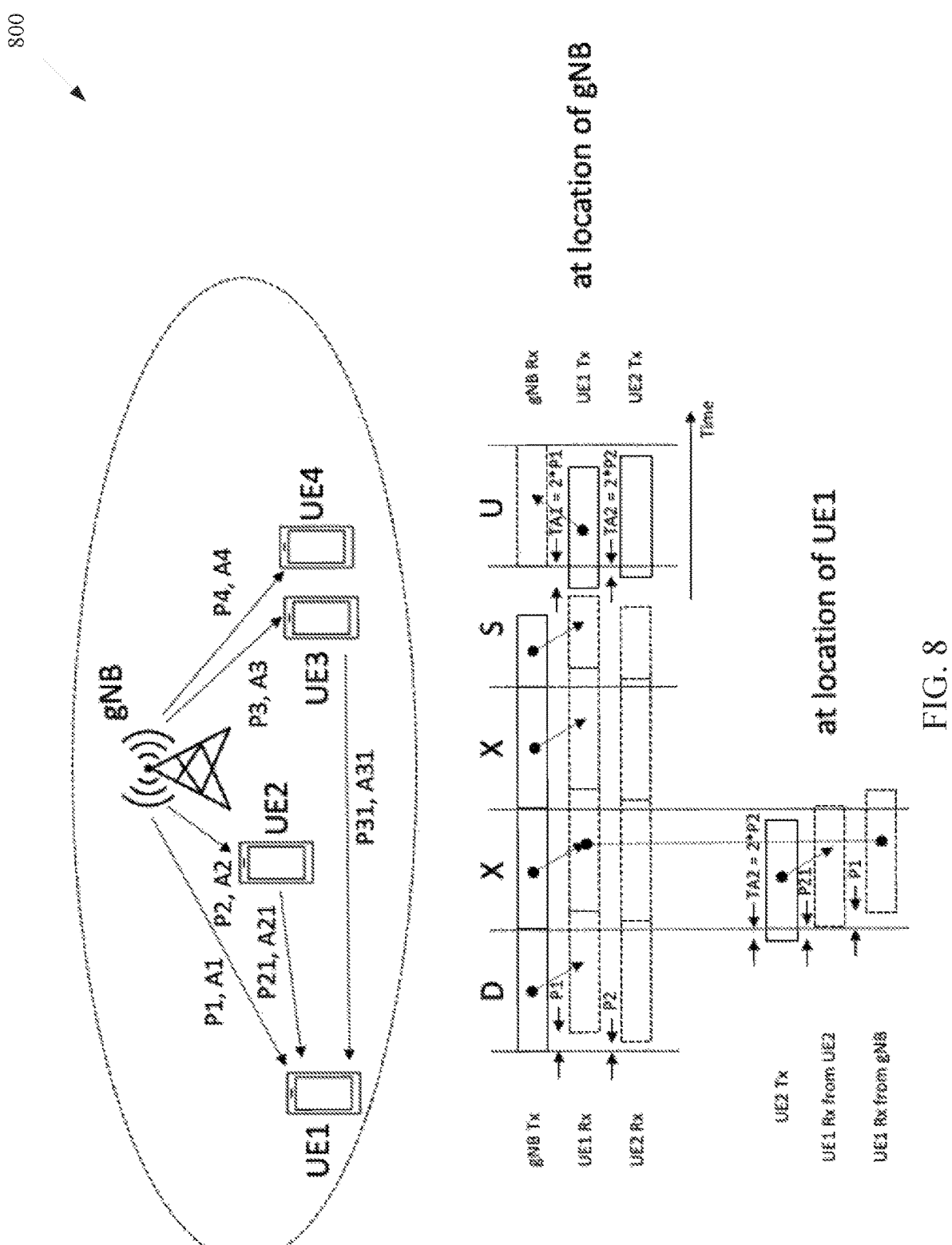
FIG. 8 illustrates an example of full-duplex communication system operation according to embodiments of the present disclosure.
Figure 13:
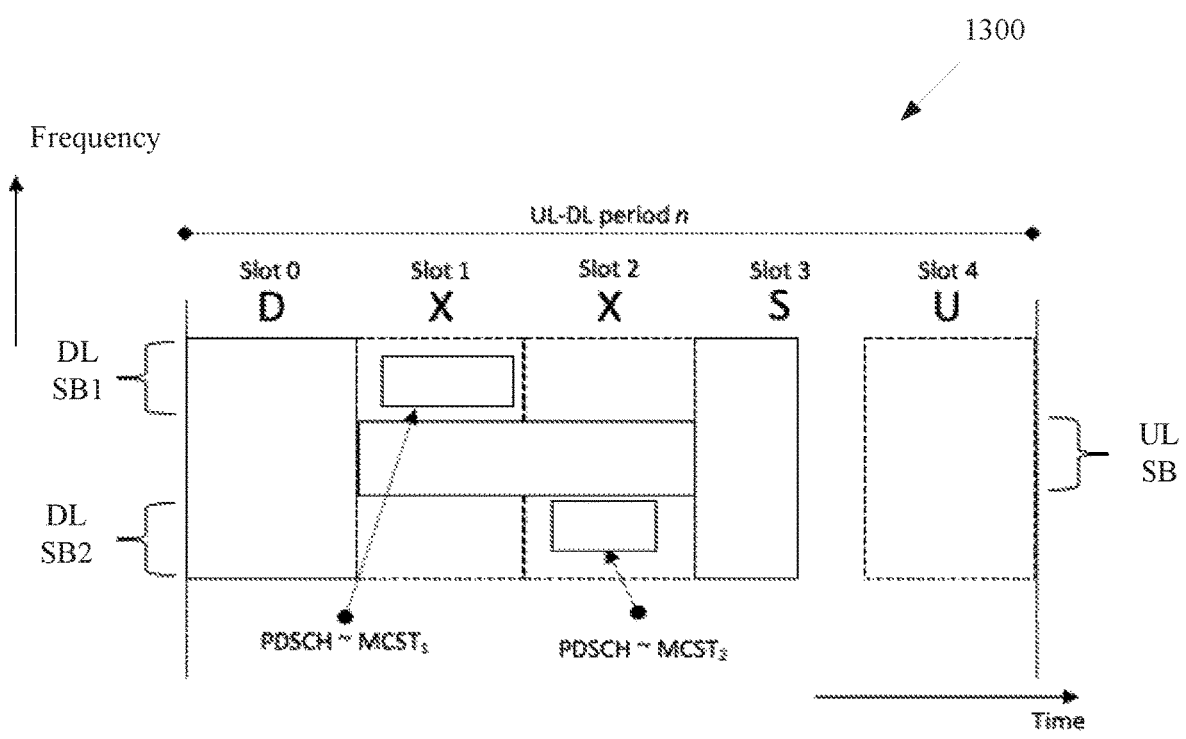
FIG. 13 illustrates an example of PDSCH reception with a first and a second MCS index table according to embodiments of the present disclosure.

FIG. 8 illustrates an example of full-duplex communication system operation 800 according to embodiments of the present disclosure. An embodiment of the full-duplex communication system operation 800 shown in FIG. 13 is for illustration only.

FIG. 8 illustrates an example FD communication system operation where a NR TDD gNB uses SCS=30 kHz and a UL-DL frame allocation of type DXXSU with duration 2.5 msec. UE1, UE2, UE3 and UE4 are served by the gNB. The timing advance settings TA1, TA2, TA3, TA4 for UE1, UE2, UE3, UE4 depend on the respective UE distances to the gNB. Transmissions and receptions from the gNB to UE1, UE2, UE3, UE4 are subject to one-way propagation delays P1, P2, P3, P4 and are attenuated by radio signal propagation losses A1, A2, A3, A4, respectively. Full-duplex communication is supported by the gNB and enabled in the second and third slots. In this example, full-duplex communication in the TDD cell uses frequency-orthogonal sub-bands, e.g., transmissions from the gNB to UEs and receptions by the gNB from UEs do not overlap in frequency domain. Transmissions from UEs in full-duplex slots can be allocated to the center subband in the second and third slots. UE1-UE4 operate with half-duplex and can either transmit or receive in a slot without being able to simultaneously receive and transmit in the slot.

The small relative distance from UE2 to gNB results in a small TA2 value and a small attenuation value A2. UE1 is further away from gNB and requires a larger TA1 value and experiences a larger attenuation value A1. UE3 and UE4 require timing advance values with TA2<TA3<TA4<TA1 and experience attenuation values with A2<A3<A4<A1. Interfering transmissions from UE2 in the second FD slot are received by UE1 earlier than transmissions from the gNB in the slot. Transmissions from UE2 interfere not only with the PDSCH that is simultaneously transmitted by the gNB to UE1 in the second slot but may also interfere with symbols of PDCCH transmissions at the beginning of the second slot. Arrival time of the interfering transmission from UE2 at the location of UE1 during reception by UE1 in the second slot is determined by 3 relative one-way propagation delays, e.g., UE2-gNB (P2), UE1-gNB (P1) and UE2-UE1 (P21). The interfering transmission from UE2 at the location of UE1 during reception by UE1 in the second slot is subject to an attenuation value A21, e.g., the radio propagation loss of a transmission from aggressor UE2 when received at the location of victim UE 1.

UL-DL interference in the second slot occurs even with subband full-duplex operation. The roll-off of the filtered Tx OFDM BB waveform from UE2 creates leakage across the entire channel BW including the DL subbands used for reception by UE1 on the same time-domain resources. Guard RBs or guard sub-carriers (SCs) or unused RBs or unused SCs between the UL and DL subbands in the second slot can mitigate, but not fully eliminate, leakage created by the UL-to-DL interference from UE2 transmissions. The amount and severity of leakage and the impact on UE1 demodulation performance depends on the receive power levels of the desired signal from the gNB and the interfering signal from UE2 that are a function of the gNB transmit power allocation (or EPRE), the distance between gNB and UE1, the UE2 transmit power (or EPRE), the distance between UE2 and UE1 and the amount of Tx and Rx filtering by UE1 and UE2.

When considering DL and UL transmissions in a full-duplex wireless communication system several issues of existing state-of-the-art technology need to be overcome.

Rel-17 NR allows a single modulation-and-coding-scheme (MCS) table for PDSCH receptions (or PUSCH transmissions), as defined in 3GPP standard specification, to be provided by RRC per bandwidth part (BWP) using a DCI format in a PDCCH reception that is also referred to as dynamic grant (DG). A UE uses a same first MCS table for all PDSCH receptions scheduled by a DCI format in an active DL BWP for the UE and a same second MCS table for all PUSCH transmissions scheduled by a DCI format in an active UL BWP for the UE. The UE uses a specified mapping for a value of the modulation-and-coding scheme (MCS) bit field ($I_{MCS}$) in the scheduling DCI format to the first or second MCS table, as described in 3GPP standard specification, to determine the modulation order ($Q_m$) and target code rate (R) of a PDSCH reception or PUSCH transmission, respectively.

For a PDSCH reception scheduled by a DCI format, one of the MCS index tables 1, 2, 3 or 4 provided by tables as illustrated in 3GPP standard specification can be indicated to a UE by RRC signaling per DL BWP. For example, an indicated index can correspond to an MCS table that supports a maximum modulation order of QAM65, QAM256, or QAM1024 or can include entries corresponding to low spectral efficiency (QPSK modulation and low coding rates) as described in 3GPP standard specification.

Similarly, for a PUSCH transmission scheduled by a DCI format, RRC signaling can configure the UE to use one MCS index table. The configured MCS index table for UL transmissions can be one of the (DL) MCS index tables 1, 2 or 3 as provided by tables as illustrated 3GPP standard specification; or the MCS index table for PUSCH with transform precoding and 64QAM provided by table or the MCS index table for PUSCH with transform precoding and 64QAM provided by table as illustrated in 3GPP standard specification. Certain provisions, as described in 3GPP standard specification, exist in assigning the MCS for the case of RAR UL grant or scheduling using DCI formats 0_0 with CRC scrambled by TC-RNTI.

Typical UE modem implementations often only provide support for Layer-1 FG 6-1 "Basic BWP operation with restriction," as described in 3GPP standard specification, wherein only one UE-specific RRC configured DL BWP per carrier and one UE-specific RRC configured UL BWP per carrier is mandated. UE support of FG 6-2 allowing for 2 BWPs in each link direction and FGs 6-3/6-4 allowing for 4 BWPs in each link direction are optional UE capabilities. Implementation of multiple BWPs by a UE is associated with increased modem complexity stemming from factors such as the resulting RRC memory requirements and challenging modem timing processing requirements due to the need to support switching of the active BWP when multiple BPWs are supported and configured.

Configurations for semi-persistent-scheduling (SPS) for PDSCH receptions or for configured grant (CG) PUSCH transmissions provided to a UE by RRC can include multiple SPS/CG RRC configurations and each configuration can provide a separate choice for the configured MCS index table. Also, when a UE supports the optional FG 5-34b (or FG 5-34c), the MCS-C-RNTI can be configured by RRC signaling to the UE. Then, a DCI format scheduling a PDSCH reception or a PUSCH transmission can include a field indicating use either of the low spectral efficiency MCS index table or of another MCS table for the UE to determine a respective modulation order ($Q_m$) and target code rate (R).

A first issue is that the use of single configured MCS index table per BWP in a full-duplex system can result in reduced spectral efficiency (SE) and therefore negatively affects user and cell throughput, reduce UL coverage, or increase latency.

An MCS index table provides a certain range for link adaptation by the gNB scheduler using the signaled MCS index value. For example, MCS index table for PDSCH (or PUSCH) as defined in table as illustrated in 3GPP standard specification allows from a resulting SE=0.2344 and QPSK modulation with the lowest setting $I_{MCS}$=0, up to a resulting SE=5.5547 and 64QAM modulation with the highest setting $I_{MCS}$=28 while $I_{MCS}$=29/30/31 and higher are intended to support re-transmissions. The gNB scheduler is then constrained to schedule PDSCH receptions by the UE (or PUSCH transmissions from the UE) using a same MCS index table in the full-duplex system in the DL (or UL). However, such constraint can be detrimental for spectral efficiency because normal slots and full-duplex slots can experience materially different interference conditions and SINRs.

For transmissions and receptions by a gNB in a full-duplex system, due to gNB antenna panel design, a different number of TRX or a larger effective Rx area may be used for receptions in a full, e.g., normal, UL slot than for receptions over the UL subband in a FD slot. A similar consideration applies to transmissions by the gNB in a full, e.g., normal, DL slot versus in the DL subband of a FD slot. For example, the gNB Rx operation in a normal UL slot may use all the available 48 TRX in a 12V×8H×2P panel, e.g., 12 rows×8 columns of antenna elements and 2 polarizations per antenna element, of size 40×60 cm. The gNB Rx operation in a FD slot may only use 16 TRX and ⅓ of the panel for Rx operation whereas the gNB may use the remaining 32 TRX and ⅔ of the panel for the simultaneous transmissions. The gNB may collect less useful received signal energy per symbol in the FD slot than in a normal UL slot.

For the example FD antenna panel configuration in a TDD deployment, a link gain in a FD slot may be smaller, e.g., by 4-5 dB, than a link gain in normal UL slots using. Similar conclusions as for receptions by a gNB apply when comparing transmissions from the gNB in a normal DL slot, such as a slot with transmission of SSB s, and in DL subbands of a full-duplex slot because transmissions in the normal DL slot may have fewer power allocation constraints and larger gain settings than transmissions in DL subbands of the FD slot. Another constraint with full-duplex operation is the limited Rx dynamic range to prevent Rx AGC blocking at the gNB when scheduling transmissions to UEs and receptions from UEs in a same time-domain resource. It may not always be possible to schedule transmissions to UEs in an FD slot using the full DL EPRE.

Different antenna and panel designs exist to support gNB-side full-duplex operation. Design options may evolve over time as implementation technology improves. However, it may be common for antennas and panels among existing and expected future design options that a number of TRXs and an available Tx or Rx aperture area used for Tx and/or Rx in normal DL or UL slots may not be same when compared to the transmissions or receptions by the gNB in full-duplex slots.

Furthermore, interference levels at the gNB receiver differ between normal UL slots and FD slots. In a normal UL slot, the gNB receiver is interfered by transmissions from UEs in neighboring TDD cells on the co-channels or the first adjacent channels. DL-UL interference is controlled by means of proper dimensioning of the GPs, e.g., typical settings of 2-4 guard symbols offer a sufficiently large distance in typical TDD deployments. gNB scheduling accounts for the increase in interference levels in the system, e.g., the expected and/or observed rise-over-thermal (RoT) due to presence of UE transmissions in the cell and its vicinity. RoT varies as a function of several parameters such as the offered traffic load from UEs and the scheduler implementation. Therefore, a gNB receiver experiences different levels of interference in FD slots.

The gNB schedules the DL subbands of a FD slot for receptions by UEs and UL subbands of the FD slot for transmissions from UEs by selecting a suitable subset of UEs from a list of possible UE candidate pairings. Combinations of UE pairings for simultaneous receptions by UEs and transmissions from UEs that may be deemed suitable in a FD slot may depend on respective spatial separation, e.g., the achievable radio isolation between these UEs when assuming that transmission from a paired UE may impact not only a reception of the reception at the gNB but also impact the reception by the other UEs in the FD slot. The possibility of a choice for pairing UEs in a FD slot may also depend on an availability of schedulable DL and UL traffic for those UEs. It can be expected that interference levels vary substantially for the different FD slots and may vary among FD and normal UL slots. Similar considerations as elaborated for the UL case also apply to the DL case.

In consequence, it would be typically preferable for an MCS for scheduling transmissions from a UE in a normal UL slot to be different from an MCS for scheduling the UE in an FD slot. For a given selected and RRC-configured MCS index table, the resolution of the $I_{MCS}$ limits the overall range for gNB link adaptation using the table and the resolution per modulation order, e.g., several MCS settings and resulting SE values are possible per modulation order. When a same MCS index table is constrained to be used in slots subject to materially different signal reception and interference conditions, such as the full-duplex slots and normal DL or UL slots, the scheduling DCI format can indicate lower MCS settings resulting in smaller SE for the FD slots and can indicate higher MCS settings resulting in larger SE for the normal DL or UL slots.

The number of MCS settings that are effectively usable given the more restrictive link conditions in FD slots when scheduling DL receptions or UL transmissions for UEs is then reduced because only a small number of MCS settings, resulting for example in QPSK modulation that is suitable for restricted link conditions in FD slots, are available when a 64QAM MCS index table is used in order to also allows for high SE MCS settings for scheduling the UE in normal DL or UL slots. For example, using the terminology as illustrated in 3GPP standard specification, it is beneficial to use the "qam64" (DL and UL) MCS index table when scheduling transmissions from a UE in a normal UL slot and use a "qam64lowSE" (DL and UL) MCS index table or use the (DFT-S-OFDM, e.g., with transform precoding) MCS index tables 1 or 2 for scheduling transmissions from the UE for UL in an FD slot. Such scheduling flexibility is not currently enabled. Furthermore, selection of an MCS that is suitable to schedule transmissions from a UE may need to vary between a first FD slot and a second FD slot depending, for example, on corresponding configurations.

If the MCS index table for a PUSCH transmission from a UE in a slot cannot be selected by the gNB scheduler according to the slot type, e.g., normal DL or normal UL slot vs. a FD slot, the UL radio range that typically determines the cell coverage, the data throughput, and the latency, are negatively impacted.

Therefore, it is beneficial to design and enable mechanisms to increase the spectral efficiency, coverage and latency achievable for PDSCH receptions and for PUSCH transmissions that are scheduled by DCI formats or indicated using CG or SPS in a TDD communication system supporting full-duplex operation.

The present disclosure addresses the above issues and provides additional design aspects for supporting PDSCH receptions and PUSCH transmissions for a UE, and provides solutions as fully elaborated in the following. The disclosure considers methods to indicate to a UE a first and a second MCS index table, $MCST_1$ and $MCST_2$, for PUSCH transmissions on a serving cell using dynamic grants or configured grants, and methods to indicate to a UE a first and a second MCS index table, $MCST_1$ and $MCST_2$, for PDSCH receptions on a serving cell using dynamic grants or SPS. The first MCS index table $MCST_1$ for the serving cell is associated with PUSCH transmissions (or PDSCH reception) by the UE in slots from a first set of slots of the serving cell, e.g., normal UL (or DL) or non-SBFD slots. The second MCS index table $MCST_2$ for the serving cell is associated with PUSCH transmissions (or PDSCH reception) by the UE in slots from a second set of slots of the serving cell, e.g., full-duplex or SBFD slots. The first and a second MCS index table MCST1 and $MCST_2$ may be provided to the UE by one or a combination of RRC signaling and/or configuration, tabulated and/or listed by system operating specifications, MAC CE signaling, or L1 control signaling by a DCI format.

In one embodiment, a UE is provided a first and a second MCS index table, $MCST_1$ and $MCST_2$, for PUSCH transmissions on a serving cell. The first MCS index table $MCST_1$ for the serving cell is associated with PUSCH transmissions by the UE in slots from a first set of slots of the serving cell. The second MCS index table $MCST_2$ for the serving cell is associated with PUSCH transmissions by the UE in slots from a second set of slots of the serving cell. An MCS index table may be used by the UE to determine parameters for PUSCH transmission in one or multiple slots where the parameters may include a modulation order, a target code rate, and/or a transport block size. The first and a second MCS index table $MCST_1$ and $MCST_2$ may be provided to the UE by one or a combination of RRC signaling and/or configuration, tabulated and/or listed by system operating specifications, MAC CE signaling, or L1 control signaling by a DCI format.

In an alternative, only the first MCS index table $MCST_1$ may be provided to the UE by RRC, and the UE may determine the second MCS index table $MCST_2$ from, e.g., MAC CE, L1 control signaling, or obtained from system specifications. The determination of the second MCS index table $MCST_2$ may depend on, and be a function of, a first provided MCS index table $MCST_1$ by configuration, e.g., the UE determines $MCST_2$ by association with the configured $MCST_1$. A first or a second MCS index table $MCST_1$ and $MCST_2$ associated with PUSCH transmissions on the serving cell may be provided to the UE by means of index values $I_{MCST,1}$ and $I_{MCST,2}$ respectively.

The UE may determine parameters for a PUSCH transmission in a slot using either the first or the second MCS index table, that is $MCST_1$ or $MCST_2$. The parameters for the PUSCH transmission may include a modulation order, a target code rate, and/or a transport block size. The first MCS index table $MCST_1$ may be used by the UE to determine parameters for PUSCH transmission in normal UL or non-SBFD slots. The second MCS index table $MCST_2$ may be used by the UE to determine parameters for a PUSCH transmission in a full-duplex or SBFD slot. The UE may determine the parameters for a PUSCH transmission in a slot using either the first or the second MCS index table, $MCST_1$ or $MCST_2$, based on an indicated condition.

A UE may select an MCS index table associated with a PUSCH transmission in a slot by determining a type for the slot, such as a normal or non-SBFD slot or a full-duplex or SBFD slot. The first and second set of slots of the serving cell associated with the first and the second MCS index table $MCST_1$ and $MCST_2$ for PUSCH transmissions may be referred to as first MCS slot group $MSG_1$ and second MCS slot group $MSG_2$. A UE may be indicated by a serving gNB one or more MCS slot groups (MSGs) for PUSCH transmissions on a serving cell where an MSG is a set of slots of the serving cell associated with a same MCS index table.

Figure 9:
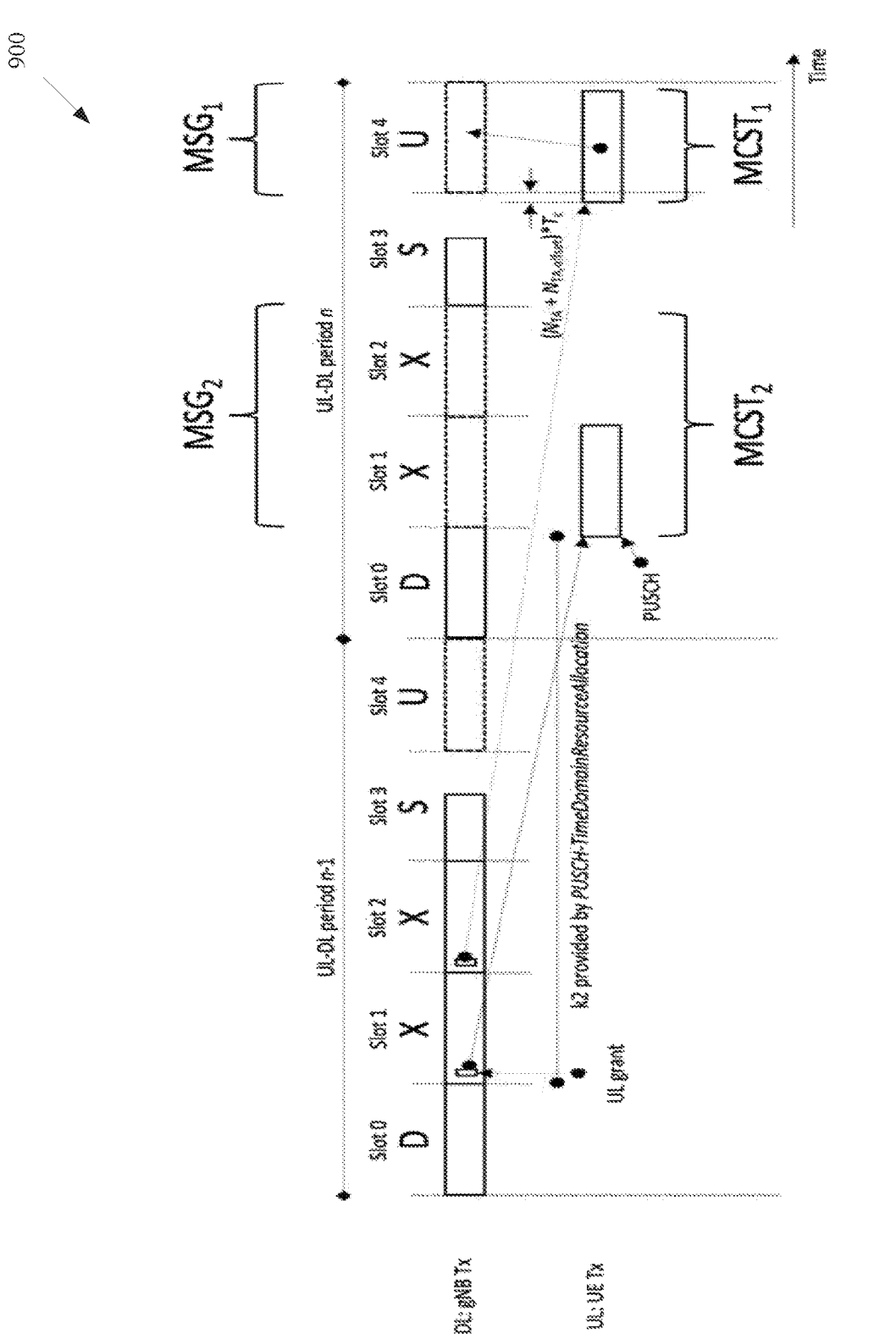
FIG. 9 illustrates an example of physical uplink control channel (PUSCH) transmission with a first and a second MCS index table according to embodiments of the present disclosure.

FIG. 9 illustrates an example of PUSCH transmission with a first and a second MCS index table 900 according to embodiments of the present disclosure. An embodiment of the PUSCH transmission with a first and a second MCS index table 900 shown in FIG. 9 is for illustration only.

As shown in FIG. 9, a first MCS slot group $MSG_1$ includes a normal UL or non-SBFD slot, e.g., slot 4, and a second MCS slot group $MSG_2$ includes full-duplex or SBFD slots, e.g., slots 1 and 2, where slots are numbered from 0 to 4. The UE determines a first MCS index table $MCST_1$ for $MSG_1$ and a second MCS index table $MCST_2$ for $MSG_2$. For example, for PUSCH transmissions on the serving cell, the UE determines the first MCS index table $MCST_1$ from an RRC provided indication using signaling messages such as RRCSetup or RRCReconfiguration or IEs included therein. The UE determines the second MCS index table $MCST_2$ from an RRC provided indication using signaling messages such as RRCSetup or RRCReconfiguration or IEs included therein. In another example, for PUSCH transmissions on the serving cell, the UE may determine the first MCS index table $MCST_1$ from an RRC provided indication and determine the second MCS index table $MCST_2$ based on a signaled index value $I_{MCST,2}$ provided by the scheduling DCI format 0_0, 0_1 or 0_2.

Several solutions for a UE to determine a first and a second MCS index table, $MCST_1$ and $MCST_2$, are described in the disclosure. In the example of FIG. 9, when the UE is scheduled for PUSCH transmission, the UE determines the parameters associated with the PUSCH transmission using MCS index table $MCST_1$ in $MSG_1$ when the transmission is in the normal UL or non-SBFD slot and determines the parameters associated with the PUSCH transmission using the MCS index table $MCST_2$ in MSG2 when the transmission is in full-duplex or SBFD slots 1 or 2. For example, the MCS index table $MCST_1$ may correspond to a MCS index table as illustrated in 3GPP standard specification; or may correspond to the MCS index table for PUSCH with transform precoding and 64QAM provided by table as illustrated in 3GPP standard specification or the MCS index table for PUSCH with transform precoding and 64QAM provided by table as illustrated in 3GPP standard specification.

Using a first and a second MCS index tables, $MCST_1$ and $MCST_2$, for scheduling PUSCH from a UE in a serving cell to control the modulation order, target code rate, and/or transport block size can be set and adjusted for separately by the gNB for the UE in normal UL or non-SBFD slots and in full-duplex or SBFD slots. For example, the gNB may indicate to a UE a first MCS index table $MCST_1$ "qam64" when scheduling a PUSCH transmission from the UE in a normal UL or non-SBFD slot and may indicate a second MCS index table $MCST_2$ for PUSCH with transform precoding and 64QAM provided by table as illustrated in 3GPP standard specification to adjust for worse UL link conditions that the experiences when scheduling a PUSCH transmission from the UE in the full-duplex or SBFD slot.

For the PUSCH reception, the gNB can adjust its receiver processing accordingly because the first and second MCS index tables, $MCST_1$ and $MCST_2$, associated with the PUSCH transmission from the UE in a particular slot, or transmission interval, are known to the gNB. The gNB can use suitable gNB-side and/or UE-reported measurements to determine the link adaptation settings for the UE in full-duplex or SBFD slot and/or normal UL or non-SBFD slots. For example, UE-transmitted SRS and/or measurements reported from one or multiple UEs using the cross-link interference management reporting feature may be used by the gNB to determine the appropriate link adaptation setting for a UE in a slot when selecting the MCS index table for scheduling PUSCH transmissions from the UE on a serving cell in MCS slot groups 1 or 2.

In one example, a first or a second MCS index table, $MCST_1$ and $MCST_2$, associated with parameters for PUSCH transmissions in different MCS slot groups is provided to the UE by higher layers, e.g., by RRC signaling.

For determination of the modulation order, target code rate, and/or TB size using the information field "Modulation and coding scheme" in the DCI format scheduling a PUSCH transmission, a UE may be indicated any existing MCS index table provided by 3GPP standard specification such as the MCS index tables 1-3 of type "qam64," "qam256," or "qam64LowSE"; or the MCS index tables 1 or 2 with transform precoding, or a new MCS table. The UE may be provided by higher layer signaling a minimum required, and/or a maximum allowed, MCS index value for PUSCH transmission in a full-duplex slot or a normal UL slot, e.g., a threshold value for a minimum or maximum MCS setting may be provided to the UE. A motivation is to allow for link adaptation settings in a full-duplex slot controlled through a higher layer provided parameter to not exceed a given limit or range of possible MCS assignments, thereby enabling better control of UL interference in a full-duplex or SBFD slot. The gNB knows the scheduled MCS indexes and can determine a resulting modulation order, coding rate, and/or TB size in presence of a minimum required, and/or maximum allowed, MCS index setting for a PUSCH transmission in a slot and adjust its receiver processing accordingly.

A UE may be informed of an MCS index table $MCST_1$ or $MCST_2$ by RRC signaling. Such information may be included in one or more signaling messages and/or IEs. For example, and without loss of generality, the parameter indicating an MCS index table $MCST_1$ or $MCST_2$ may be signaled from the gNB to the UE as part of RRC signaling messages of type RRCSetup, RRCReconfiguration, SIB1 or SystemInformation and may be included in RRC IEs of type ServingCellConfig, ServingCellConfigCommon, or ServingCellConfigSIB1. Such RRC parameters may be of enumerated, listed or sequence type and/or may be encoded as a bit string.

In one example, a parameter indicating MCS index table $MCST_1$ or $MCST_2$ may be included into an information element of type PUSCH-TimeDomainResourceAllocation. The example can be generalized to include the possibility of providing multiple MCS index table parameters $MCST_1$ or $MCST_2$ for multi-slot PUSCH allocation when assigning different MCS index table values to different row indexes where the slot occurs in the PUSCH-TimeDomainResourceAllocation table.

As can be seen by someone skilled-in-the-art, solutions exemplified for the case of UL scheduling using dynamic grants extend to the case of UL scheduling using configured grants. For Type 1 PUSCH transmission with a configured grant, higher layer provided parameters are applied to indicate the parameters for PUSCH transmissions from the UE. For Type 2 PUSCH transmissions with a configured grant, the parameters for the PUSCH transmission are indicated by higher layer configuration as illustrated in 3GPP standard specification and an UL grant received on the DCI. For example, when using configured grants for PUSCH transmissions, the MCS index table can be indicated by higher layer parameter configuredGrantConfig in BWP-UplinkDedicated.

Solutions and examples described to provide a first and a second MCS index table, $MCST_1$ and $MCST_2$, for PUSCH transmissions using a configured grant on a serving cell and associated with a first set of slots and with a second set of slots can be applied with suitable modifications, e.g., providing the corresponding IEs or fields and indications for the first and second MCS index tables provided for a CG using the higher layer parameter configuredGrantConfig. A motivation is that the slot type of the PUSCH transmissions using a configured grant may vary, e.g., using the SBFD UL subband of a SBFD slot or the normal UL or non-SBFD slot depending on the periodicity of the configured grant transmissions. An MCS index table suitable to the characteristics of the slot type may then be indicated to the UE provided with a configured grant when two MCS tables can be provided for the SBFD slot and normal UL or non-SBFD slot respectively using a same configured grant configuration. Note that retransmissions for CG are scheduled by DCI that uses CS-RNTI.

Figure 10:
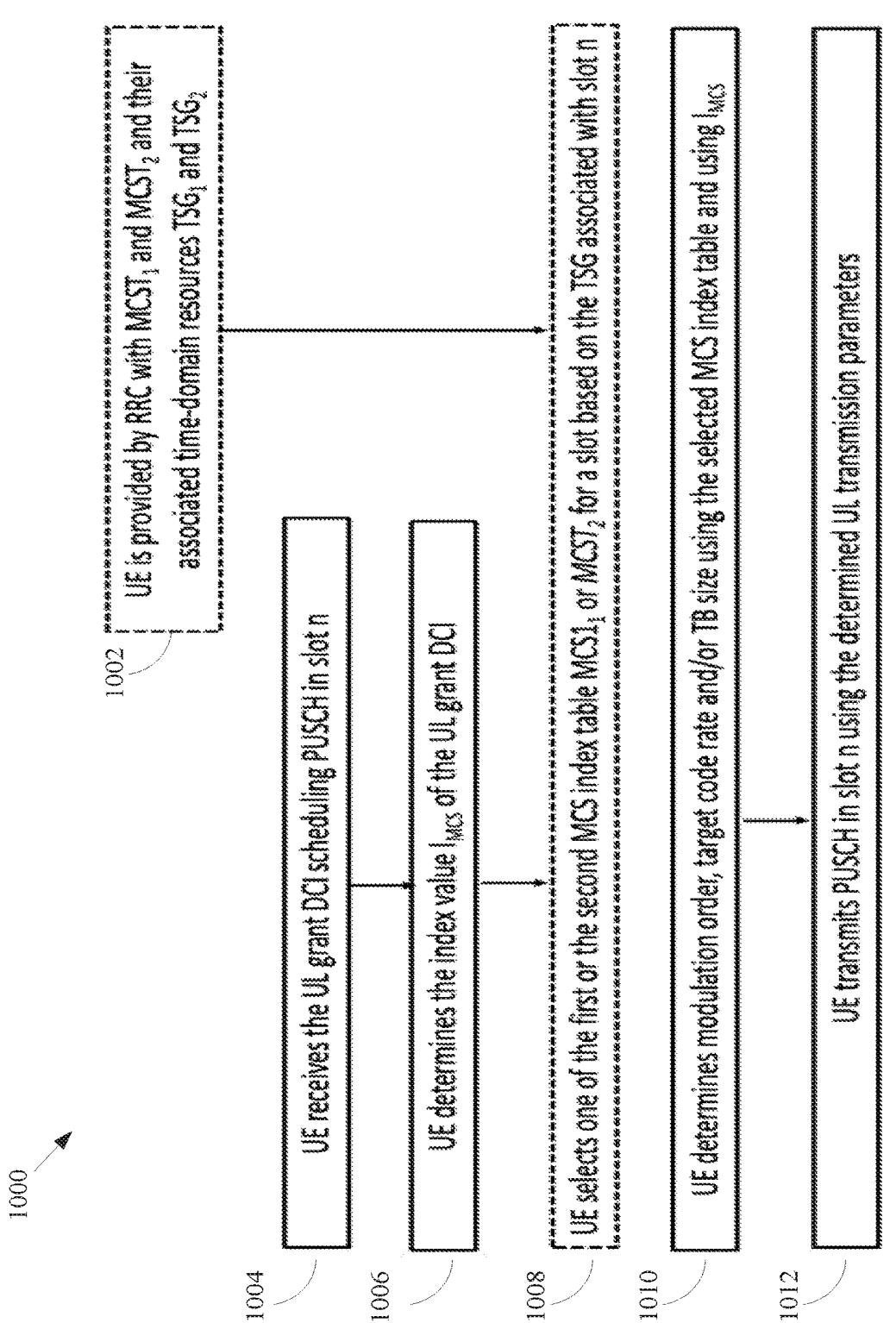
FIG. 10 illustrates a flowchart of UE operation for PUSCH transmission according to embodiments of the present disclosure.

FIG. 10 illustrates a flowchart of UE operation 1000 for PUSCH transmission according to embodiments of the present disclosure. The UE operation 1000 as may be performed by a UE (e.g., 111-116 as illustrated in FIG. 1). An embodiment of the UE operation 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, a UE is provided first and second MCS index tables, $MCST_1$ and $MCST_2$, that are associated with the parameters for PUSCH transmission in first and second subsets of slots, respectively, e.g., a first set of slots that is part of $MSG_1$ and a second set of slots that is part of $MSG_2$. When the UE receives a DCI format scheduling a PUSCH transmission in a slot, the UE selects an applicable MCS index table for the associated PUSCH time domain-resource from the set of configured first and second MCS index tables, $MCST_1$ and $MCST_2$, associated with a PUSCH transmission in that slot. The UE determines a modulation order $(Q_m)$ and a target code rate (R) for the PUSCH transmission using the MCS index table associated with that slot and using the MCS bit field $(I_{MCS})$ indicated by the DCI format scheduling the PUSCH transmission.

As illustrated in FIG. 10, in step 1002, a UE is provided by RRC with $MCST_1$ and $MCST_2$ and their associated time-domain resources $TSG_1$ and $TSG_2$. In step 1004, the UE receives the UL grant DCI scheduling PUCCH in slot n. In step 1006, the UE determines the index $I_{MCS}$ of the UL grant DCI. In step 1008, the UE selects one of the first or the second MCS index table $MCS_1$ or $MCST_2$ for a slot based on the TSG associated with slot n. In step 1010, the UE determines modulation order, target code rate and/or TB size using the selected MCS index table and using $I_{MCS}$. In step 1012, the UE transmits PUSCH in slot n using the determined UL transmission parameters.

In one example, a first or a second MCS index table value, $MCST_1$ or $MCST_2$, associated with the PUSCH transmission parameters in different MCS slot groups may be provided to the UE by system operating specifications, e.g., tabulated and/or listed.

For example, the first MCS index table $MCST_1$ is provided to the UE by RRC signaling and the UE determines a second MCS index table $MCST_2$ by selecting a value from a set of tabulated or listed values provided by system specifications. The first signaled MCS index table and the second provided MCS index table may be separate and allow for independent settings of the first or the second MCS index table $MCST_1$ and $MCST_2$ associated with the PUSCH transmission parameters in normal UL or non-SBFD slots or full-duplex or SBFD slots. The second provided MCS index table may be used together with the first signaled MCS index table to determine a resulting MCS value.

In one example, a UE may be configured with one or more MSGs for PUSCH transmission on a serving cell where, as previously defined, an MSG is a set of slots of a serving cell associated with a same MCS index table. The first and second set of slots of the serving cell associated with a first and a second MCS index table, $MCST_1$ and $MCST_2$, for PUSCH transmission may be referred to as a first MCS slot group $MSG_1$ and a second MCS slot group $MSG_2$. An MSG containing a normal UL or SBFD slot may be referred to as primary MCS slot group (PMSG) and other MCGs may be referred to as secondary MCS slot group (SMSG). For example, an SMSG may be include slots that support full-duplex transmissions from/to a UE or a serving gNB.

In one embodiment, a UE determines first and second MCS index tables, $MCST_1$ and $MCST_2$, for a PDSCH reception in a serving cell. The first MCS index table $MCST_1$ for a serving cell is associated with PDSCH receptions by the UE in a first set of slots of the serving cell. The second MCS index table $MCST_2$ for a serving cell is associated with PDSCH receptions by the UE in a second set of slots on the serving cell. An MCS index table may be used by the UE to determine parameters for PDSCH reception in one or multiple slots. The parameters may include a modulation order, target code rate, and/or transport block size. A first and a second MCS index table, $MCST_1$ and $MCST_2$, associated with the parameters for PDSCH transmissions in different MCS index table slot groups may be provided to the UE by one or more of RRC signaling, tabulated and/or listed by system operating specifications, MAC CE signaling, or L1 control signaling by a DCI format.

Only a first MCS index table $MCST_1$ associated with PDSCH reception may be provided to the UE by RRC and the UE may determine a second MCS index table $MCST_2$ for the PDSCH reception from, e.g., MAC CE, L1 control signaling, or system specifications. The determination of a second MCS index table $MCST_2$ for PDSCH receptions by the UE may depend on, and be a function of, a first provided MCS index table $MCST_1$, for example based on RRC signaling, and the UE can determine $MCST_2$ by association with the $MCST_1$. A first or a second MCS index table $MCST_1$ and $MCST_2$ associated with PDSCH reception on a serving cell may be provided to the UE by means of index values $I_{MCST,1}$ and $I_{MCST,2}$, respectively.

The UE may determine the parameters for PDSCH reception in a slot using either the first or the second MCS index table $MCST_1$ or $MCST_2$. The parameters may include a modulation order, target code rate, and/or transport block size. The UE may use a first MCS index table $MCST_1$ to determine parameters for PDSCH receptions in normal DL or non-SBFD slots and a second MCS index table $MCST_2$ to determine parameters for PDSCH receptions in full-duplex or SBFD slots. The UE may determine the parameters for PDSCH reception in a slot by selecting from the first and the second MCS index table $MCST_1$ and $MCST_2$ using an indicated condition.

The UE may select an MCS index table associated with a PDSCH reception in a slot by determining a slot type. As for PUSCH transmissions, the first and second set of slots of the serving cell associated with the first and the second MCS index tables, $MCST_1$ and $MCST_2$, for PDSCH receptions may be referred to as a first MCS slot group $MSG_1$ and a second MCS slot group $MSG_2$. A UE may be configured with one or more MCS slot groups (MSGs) for PDSCH receptions on a serving cell where an MSG is a set of slots of a serving cell associated with a same MCS index table.

Figure 11:
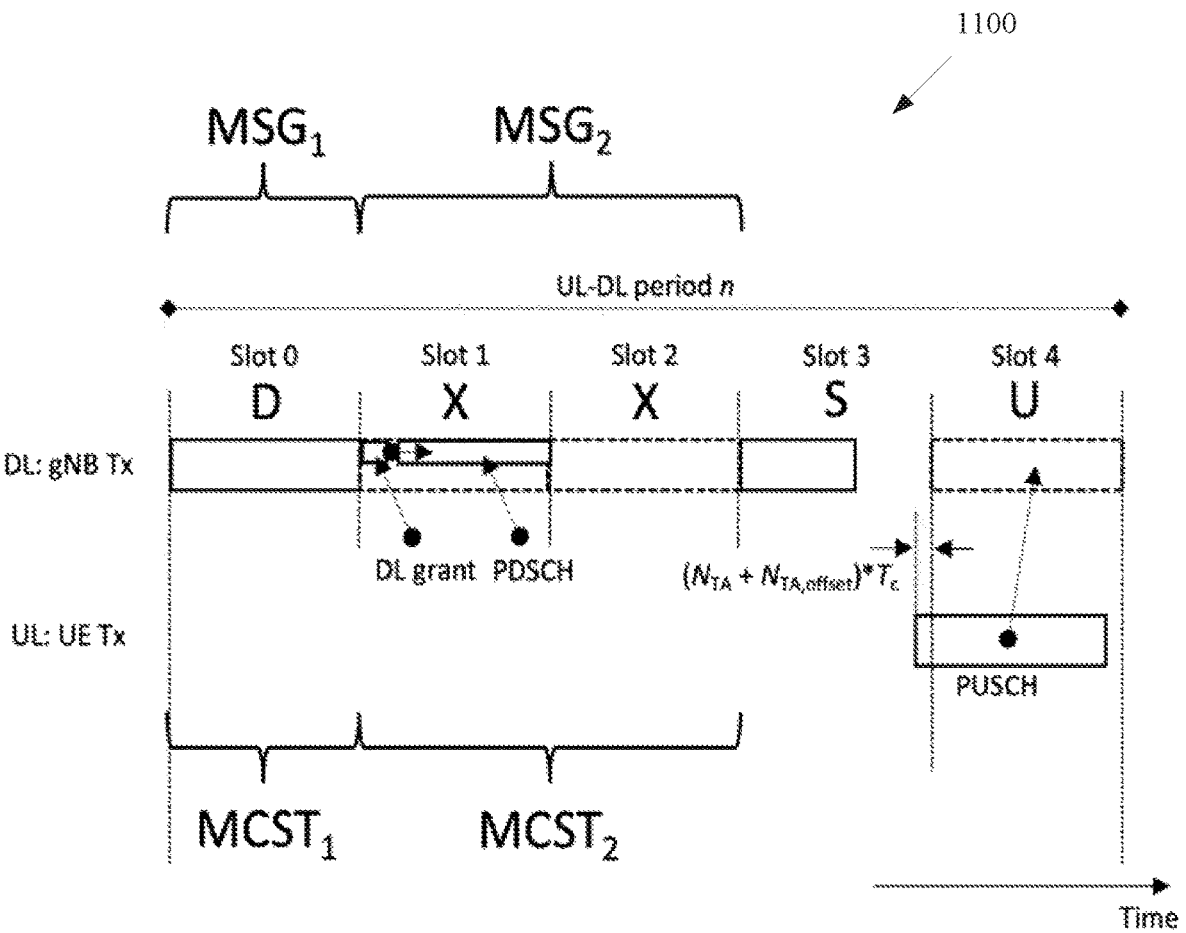
FIG. 11 illustrates an example of PDSCH reception with a first and a second MCS index table according to embodiments of the present disclosure.

FIG. 11 illustrates an example of PDSCH reception with a first and a second MCS index table 1100 according to embodiments of the present disclosure. An embodiment of the PDSCH reception with a first and a second MCS index table 1100 shown in FIG. 11 is for illustration only.

As shown in FIG. 11, a first MCS slot group $MSG_1$ includes the normal DL or non-SBFD slot, e.g., slot 0, and a second MCS slot group $MSG_2$ includes the full-duplex or SBFD slots, e.g., slots 1 and 2, where slots are numbered from 0 to 4. The UE determines a first MCS index table $MCST_1$ for $MSG_1$ and a second MCS index table $MCST_2$ for $MSG_2$. For example, the UE determines the first MCS index table $MCST_1$ from an RRC provided indication using signaling messages such as RRCSetup or RRCReconfiguration or IEs included therein. The UE determines the second MCS index table $MCST_2$ from an RRC provided indication using signaling messages such as RRCSetup or RRCReconfiguration or IEs included therein. In another example, the UE may determine the first MCS index table $MCST_1$ from an RRC provided indication and determine the second MCS index table $MCST_2$ based on a signaled index value $I_{MCST,2}$ provided by a DCI format 1_0, 1_1 or 1_2 that schedules the PDSCH reception.

Several solutions for determination by a UE of first and second MCS index tables, $MCST_1$ and $MCST_2$, are described in the disclosure. In the example of FIG. 11, the UE determines parameters associated with a PDSCH reception using MCS index table $MCST_1$ in $MSG_1$ when the PDSCH reception is in a normal DL or non-SBFD slot and using the MCS index table $MCST_2$ of $MSG_2$ when the PDSCH reception is in full-duplex or SBFD slots 1 or 2. The parameters may include a modulation order, target code rate, and/or transport block size. For example, the MCS index table $MCST_1$ for PDSCH reception may correspond to MCS index tables 1, 2, 3 or 4 as provided by tables as illustrated in 3GPP standard specification.

Using first and second MCS index tables $MCST_1$ and $MCST_2$ for scheduling PDSCH allocations for a UE on a serving cell, allows a serving gNB to separately control and adjust the modulation order, target code rate, and/or transport block size in normal DL or non-SBFD slots and in full-duplex or SBFD slots. For example, the gNB may indicate to the UE a first MCS index table $MCST_1$ "qam64" for PDSCH reception in normal DL or non-SBFD slots and indicate a second MCS index table $MCST_2$ with "qam64lowSE" to adjust for worse DL link conditions experienced by the UE for PDSCH reception in full-duplex or SBFD slots. The UE can adjust its receiver processing accordingly because the UE whether the first or the second MCS index tables, $MCST_1$ or $MCST_2$, are used for a PDSCH reception in a particular slot or transmission interval. The gNB can use suitable measurements, obtained by the gNB or reported by the UE, to determine the link adaptation settings for the UE in full-duplex slots and/or normal DL slots. For example, the gNB can use SRS receptions from UEs and/or measurements reported from UEs using the cross-link interference management reporting feature to determine the appropriate link adaptation setting for UEs in a slot when selecting the MCS index table for PDSCH receptions in MCS slot groups 1 or 2 for scheduling on a serving cell.

In one example a first or a second MCS index table, $MCST_1$ or $MCST_2$, associated with PDSCH reception parameters in different MCS slot groups is provided to the UE by higher layers, e.g., by RRC signaling.

For determination of the modulation order, target code rate, and/or TB size using the information field "Modulation and coding scheme" in a DCI format scheduling a PDSCH reception, the UE may be indicated any MCS index table provided by 3GPP standard specification such as the MCS index tables 1-4 of type "qam64," "qam256," "qam64 Low SE," or "qam1024," or a new MCS table may be provided to the UE. The UE may be provided by higher layer signaling a minimum required, and/or a maximum allowed, MCS index value for PDSCH receptions in a slot associated with transmissions from a serving gNB using a full-duplex or SBFD slot or using a normal DL or non-SBFD slot, e.g., a threshold value for a minimum or maximum MCS setting may be provided to the UE.

A motivation is to allow for link adaptation settings, controlled through a parameter provided by higher layers, in a full-duplex or SBFD slot to not exceed a given limit or range of possible MCS assignments in order to improve control of DL interference in the full-duplex or SBFD slot. The gNB knows the scheduled MCS indexes and can determine a resulting modulation order, coding rate, and/or TB size in presence of a minimum required, and/or maximum allowed, MCS index setting for PDSCH reception in a slot and adjust its receiver processing accordingly.

A UE may be provided with an MCS index table, $MCST_1$ or $MCST_2$, by RRC signaling. Such configuration may be included in one or more signaling messages and/or IEs. For example, and without loss of generality, a parameter indicating an MCS index table $MCST_1$ or $MCST_2$ may be provided from the gNB to the UE as part of RRC signaling messages of type RRCSetup, RRCReconfiguration, SIB1 or SystemInformation and may be included in RRC IEs of type ServingCellConfig, ServingCellConfigCommon, or ServingCellConfigSIB1. Such RRC configuration parameters may be of enumerated, listed or sequence type and/or may be encoded as a bit string.

In one example, the parameter indicating MCS index table $MCST_1$ or $MCST_2$ may be included in an information element of type PDSCH-TimeDomainResourceAllocation. The example can be generalized to include the possibility of providing multiple configured MCS index table parameters $MCST_1$ or $MCST_2$ for multi-slot PDSCH allocation when assigning different MCS index table values to different row indexes where the slot occurs in the PDSCH-TimeDomain-ResourceAllocation table.

As can be seen by someone skilled-in-the-art, solutions exemplified for the case of DL scheduling using dynamic grants extend to the case of DL scheduling using semi-persistent scheduling (SPS). For PDSCH receptions with SPS, the parameters for the PDSCH reception are indicated by higher layer configuration as described by 3GPP standard specification, and a DL assignment received on the DCI. For example, when using SPS for PDSCH reception, the MCS index table can be indicated by higher layer parameter SPS-Config using the mcs-table IE. Solutions and examples described to provide a first and a second MCS index table, $MCST_1$ and $MCST_2$, for PDSCH receptions using SPS on a serving cell and associated with a first set of slots and with a second set of slots can be applied with suitable modifications, e.g., providing the corresponding IEs or fields and indications for the first and second MCS index tables provided for SPS using the higher layer parameter SPS-Config and mcs-table1 and mcs-table2 IEs.

A motivation is that the slot type of the PDSCH reception using SPS may vary, e.g., using the SBFD DL subband of an SBFD slot or the normal DL (or S) non-SBFD slot depending on the periodicity of the SPS reception. An MCS index table suitable to the characteristics of the slot type may then be indicated to the UE provided with SPS for a same SPS configuration when two MCS index tables can be provided for the SBFD slot and normal DL (or S) non-SBFD slot respectively. Note that retransmissions for SPS are scheduled by DCI that uses CS-RNTI.

FIG. 12 illustrates a flowchart of UE operation 1200 for PDSCH transmission according to embodiments of the present disclosure. The UE operation 1200 as may be performed by a UE (e.g., 111-116 as illustrated in FIG. 1). An embodiment of the UE operation 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, the UE is provided first and second MCS index tables, $MCST_1$ and $MCST_2$, associated with parameters for PDSCH receptions in first and in second subsets of slots, e.g., a first set of slots part of $MSG_1$ and a second set of slots part of $MSG_2$. When the UE receives a DCI format scheduling a PDSCH reception in a slot, the UE selects the applicable MCS index table for the PDSCH reception in the slot from the set of configured first and second MCS index tables, $MCST_1$ and $MCST_2$, associated with the slot. The UE determines the modulation order ($Q_m$) and target code rate (R) for the PDSCH reception using the MCS index table associated with the slot based on the MCS bit field ($I_{MCS}$) in the DCI format scheduling the PDSCH reception.

As illustrated in FIG. 12, in step 1202, a UE is provided by RRC with $MCST_1$ and $MCST_2$ and their associated time-domain resources $TSG_1$ and $TSG_2$. In step 1204, the UE receives the DL grant DCI scheduling PDSCH in slot n. In step 1206, the UE determines the index value $I_{MCS}$ of the DL grant DCI. In step 1208, the UE selects one of the first or the second MCS index table $MCS_1$ or $MCST_2$ for a slot based on the TSG associated with slot n. In step 1210, the UE determines modulation order, target code rate and/or TB size using the selected MCS index table and using $I_{MCS}$. In step 1212, the UE transmits PUSCH in slot n using the determined DL transmission parameters.

In one example, a first or a second MCS index table value, $MCST_1$ or $MCST_2$, associated with parameters for PDSCH receptions in different MCS slot groups may be provided to the UE by system operating specifications, e.g., tabulated and/or listed.

For example, the first MCS index table $MCST_1$ is provided to the UE by RRC signaling, and the UE determines a second MCS index table $MCST_2$ by selecting a value from a set of tabulated or listed values provided by system specifications. The first signaled MCS index table and the second provided MCS index table may be separate and allow for independent settings of the first or the second MCS index table $MCST_1$ and $MCST_2$ associated with the PDSCH reception parameters in normal DL or non-SBFD slots or full-duplex or SBFD slots. The second provided MCS index table may be used together with the first signaled MCS index table to determine a resulting MCS value.

In one example, a UE may be configured with one or more MSGs, as previously described, for PUSCH transmissions or PDSCH receptions on a serving cell. The first and second sets of slots of the serving cell associated with the first and second MCS index tables $MCST_1$ and $MCST_2$ for PUSCH transmissions or PDSCH receptions may be referred to as first MCS slot group $MSG_1$ and second MCS slot group $MSG_2$, respectively. An MSG that includes normal UL or normal DL or non-SBFD slots may be referred to as primary MCS slot group (PMSG) and an MCG that includes other types of slots may be referred to as t secondary MCS slot group (SMSG). For example, an SMSG may be configured to include slots where full-duplex or SBFD transmission from/to a serving gNB is supported.

An MSG may be configured to contain only a single slot, or there may be only a single MSG, e.g., the MSG comprises all slots. The determination of parameters for PDSCH receptions or PUSCH transmissions associated with an MCS value by the UE in a slot may then be described by not using the term "MSG" and instead using the term "slot" in the following exemplary procedures described in the disclosure. Instead of the term "MSG," a set of slots of a serving cell associated with a same MCS index table may be referred to as "association window." The first and the second MCS index tables $MCS_1$ or $MCS_2$ for PUSCH transmissions or PDSCH receptions on a serving cell may then be applied by the UE to determine the associated parameters of a PUSCH transmission or PDSCH reception during a first time period that includes a first number of slots of the serving cell and a second time period that includes a second number of slots, respectively.

When an MSG includes more than one slot, the slots of the MSG can be consecutive or non-consecutive. One or multiple MSGs may be indicated to a UE, for example by parameter n-msgList, as described in the disclosure. For example, a first MSG containing a normal UL (or DL) or non-SBFD slot may be indicated to the UE. A second MSG containing a full-duplex or SBFD slot may also be indicated to the UE. When an MCS index table $MCST_k$ is determined by, or provided to, the UE for an $MSG_k$, the MCS index table $MCST_k$ is applied by the UE to determine associated parameters of a PUSCH transmission (or PDSCH reception) for a slot in $MSG_k$. The UE does not apply the MCS index table $MCST_k$ to determine the associated UL (or DL) parameters of a PUSCH transmission (or PDSCH reception) in a slot when the slot is not part of the $MSG_k$.

One or multiple MCS index tables $MCST_k$ may be associated with an MSG, e.g., one or more values $MCST_k$ may be determined by, or provided to, the UE. When an MSG is associated with multiple MCS index tables, the UE can select an MCS index table $MCST_k$ for the slot from the set of determined or provided MCS index tables associated with the MSG by selecting the MCS index table $MCST_k$ according to a specified rule, e.g., depending on an UL (or DL) transmission format, a priority level, or the order or sequence that values are determined by or provided to the UE.

A UE may be provided by higher layers a parameter n-msgList that may include one or more of slots in a MSG and associated timer, or counter, or priority values. The parameter n-msgList may be provided by RRC signaling messages and IEs. For example, and without loss of generality, parameter n-msgList may be signaled from a serving gNB to a UE as part of RRC signaling messages of type RRCSetup, RRCReconfiguration, SIB1 or SystemInformation and may be included in RRC IEs of type ServingCell-Config, ServingCellConfigCommon, or ServingCellConfigSIB1. Such RRC parameters may be of enumerated, listed or sequence type and/or may be encoded as a bit string.

For example, a configuration for parameter n-msgList may be provided as SEQUENCE (SIZE (1 . . . maxN-rofMSGs)) OF Msg where "Msg" is a bit string of size M. For example, M=10 or a multiple thereof. When Msg={0011000000}, the 2nd and 3rd slot or slot 2 and 3 in a sequence of 10 slots numbered from 0 to 9 are configured as part of the MCS slot group MSG2. When Msg={0000000011}, slots 8-9 in a sequence of 10 slots are configured as part of the MCS slot group MSG1, etc.

In one example, the UE selects an MCS index table associated with a PUSCH transmission or PDSCH reception in a slot by determining a slot type.

When the UE receives DCI format scheduling a PUSCH transmission or PDSCH reception in a slot, the UE determines a type for the slot and selects an MCS index table $MCST_k$ to determine the parameters (modulation, coding rate, and TB size) for the PUSCH transmission or PDSCH reception in the slot using the determined slot type. The slot type may include one or a combination of the following:

slot and/or symbol types of type D (Downlink), U (Uplink) or F (Flexible) in a TDD common or dedicated UL-DL frame configuration or provided through SFI such as in DCI F2_0 described in 3GPP standard specification;

slot and/or symbol types of type "simultaneous Tx-Rx," "Rx only," or "Tx only," e.g., associated with a TDD common or dedicated slot and/or symbol configuration providing a resource type indication; and/or slot and/or symbol type configuration associated with xdd-config, e.g., slot and/or symbol type for which an SBFD DL subband or SBFD UL subband is indicated for an SBFD slot or for which the default configuration is indicated for a normal DL or UL or non-SBFD slot.

In one example and exemplifying the procedure for PUSCH transmission, the UE selects an MCS index table $MCS_k$ to determine the parameters of the PUSCH transmission in a slot using the higher layer provided TDD UL-DL frame configuration in tdd-UL-DL-ConfigurationCommon and/or tdd-UL-DL-ConfigurationDedicated. The UE determines the TDD UL-DL frame configuration of a serving cell from a SIB, such as a SIB1 or by UE-specific RRC signaling. A slot or symbol can be of type "D," "U" or "F." The UE determines a slot type for the slot of the PUSCH transmission using the higher layer provided TDD UL-DL frame configuration. The UE does not expect the DCI format scheduling the PUSCH transmission to indicate a slot configured as type "D." If the determined slot type of a slot with PUSCH transmission is "U," the UE selects the first MCS index table $MCST_1$.

If the determined slot type of a slot with PUSCH transmission is "F," the UE selects the second MCS index table $MCST_2$. A motivation is that slots of type "U" cannot be used by the gNB for transmissions to legacy UEs. Therefore, full-duplex transmission in the DL direction of such a slot is only possible to UEs that support for full-duplex transmissions on the serving cell. Another motivation is that for interference protection in the network, use of flexible slots for the purpose of full-duplex scheduling by the gNB is generally preferred, e.g., UL slots can be reserved and assumed to be available only for transmissions from UEs in order to ensure UL access to any type of UE (regardless of whether or not the UE supports full-duplex operation).

After the selection of an MCS index table $MCST_k$ by the UE for a slot with PUSCH transmission, the UE applies the selected MCS index table $MCST_k$ to determine the associated parameters of the PUSCH transmission in the slot. Similar considerations apply to the DL case. Similar considerations apply to the case where parameter xdd-config indicates a slot or symbol type where full-duplex operation is possible if scheduled by providing an UL SB or DL SB configuration on selected radio resources.

In one example exemplifying the procedure for PUSCH transmission, the UE selects an MCS index table $MCST_k$ to determine the parameters of a PUSCH transmission in a slot using a higher layer provided resource type configuration in xdd-config. The UE determines the resource type configuration of a serving cell by receiving a SIB, such as a SIB1, or by UE-specific RRC signaling. For example, the resource type indication provided to the UE by higher layers indicates, for a slot or symbol or symbol group, if the transmission resource is of type "simultaneous Tx-Rx," "Rx only," or "Tx only." For example, a transmission resource of type "simultaneous Tx-Rx," "Rx only," or "Tx only" can be provided per slot type "D," "U" or "F" in a slot.

Alternatively, the indication of the resource type may be provided independent of the transmission direction of a slot or symbol indicated to the UE by the TDD UL-DL frame configuration provided by higher layers. The UE determines a resource type for the slot of the PUSCH transmission using the higher layer provided resource type configuration. The UE does not expect the DCI format scheduling the PUSCH transmission to indicate a slot configured as type "Rx only." If the determined type of the slot of the PUSCH transmission is "Tx only," the UE selects the first MCS index table $MCST_1$. If the determined type of the slot of the PUSCH transmission is "simultaneous Tx-Rx," the UE selects the second MCS index table $MCS_2$.

A motivation is that by configuring a slot as type "Tx-only" versus "simultaneous Tx-Rx," the UE may distinguish between slots where the UE may assume that only transmissions from UEs occur versus slots where the UE cannot make any assumption for the scheduling decisions by the gNB for transmissions or receptions by UEs in such slots. Accordingly, the UE selects and uses the more conservative MCS index table $MCST_2$ for the full-duplex or SBFD slot. After the selection of an MCS index table $MCS_k$ by the UE for the slot of the PUSCH transmission, the UE applies the selected MCS index table $MCS_k$ to determine the associated parameters of the PUSCH transmission in the slot. Similar considerations apply to the DL case.

In one example and illustrating subband non-overlapping full-duplex operation, a DL or F slot is used by the gNB for full-duplex transmissions and receptions. When a UE receives DL transmissions from the gNB in a full-duplex or SBFD slot, the UE may be scheduled in an SBFD DL subband of the full-duplex or SBFD slot. There may be $N_{DL}=1$ or $N_{DL}=2$ DL subbands in the full-duplex slot. When a UE is scheduled UL transmission to the gNB in a full-duplex or SBFD slot, these may be scheduled in an SBFD UL subband of the full-duplex or SBFD slot. There may be $N_{UL}=1$ UL subband in the full-duplex or SBFD slot. The gNB may allocate part of the SBFD UL subband or the entire SBFD UL subband in the full-duplex or SBFD slot for DL reception by UEs when scheduling the full-duplex or SBFD slot. In another example, an UL slot is used by the gNB for full-duplex transmissions and receptions.

When a UE receives DL transmissions from the gNB in the full-duplex slot, the UE may be scheduled in an SBFD DL subband of the full-duplex or SBFD slot. There may be $N_{DL}=1$ DL subband in the full-duplex or SBFD slot. When a UE is scheduled for UL transmission to the gNB in a full-duplex or SBFD slot, the UE may be scheduled by the gNB in an SBFD UL subband of the full-duplex or SBFD slot. There may be $N_{UL}=1$ or $N_{UL}=2$ UL subband(s) in the full-duplex or SBFD slot. The gNB may allocate part of the SBFD DL subband or the entire SBFD DL subband of the full-duplex or SBFD slot for UL transmissions from UEs when scheduling the full-duplex slot.

The present disclosure addresses the above issues and provides additional design aspects for supporting PDSCH receptions and PUSCH transmissions for a UE, and provides solutions as fully elaborated in the following. The disclosure considers methods to indicate to a UE a first and a second MCS index table, $MCST_1$ and $MCST_2$, associated with a first SBFD DL subband and a second SBFD DL subband or a first SBFD DL subband a second SBFD UL subband of a full-duplex or SBFD slot for PDSCH receptions on a serving cell using dynamic grants or SPS, and methods to indicate to a UE a first and a second MCS index table, $MCST_1$ and $MCST_2$, associated with a first SBFD UL subband and a second SBFD UL subband or a first SBFD UL subband a second SBFD DL subband of a full-duplex or SBFD slot for PUSCH transmissions on a serving cell using dynamic grants or CG. The first and a second MCS index table $MCST_1$ and $MCST_2$ may be provided to the UE by one or a combination of RRC signaling and/or configuration, tabulated and/or listed by system operating specifications, MAC CE signaling, or L1 control signaling by a DCI format.

In one embodiment, the UE determines first and second MCS index tables, $MCST_1$ and $MCST_2$, for a PDSCH reception in a serving cell. In one example, the first MCS index table $MCST_1$ for a serving cell is associated with PDSCH receptions by the UE in a first SBFD DL subband of a full-duplex or SBFD slot on the serving cell. The second MCS index table $MCST_2$ is associated with PDSCH receptions by the UE in a second SBFD DL subband of the full-duplex or SBFD slot on the serving cell. One motivation is that the gNB can indicate to the UE the use of different MCS index tables for the first and the second SBFD DL subbands in the SBFD slot respectively to account for different link gains and transmission power constraints for full-duplex operation.

In another example, the first MCS index table $MCST_1$ for a serving cell is associated with PDSCH receptions by the UE in a first SBFD DL subband of a full-duplex or SBFD slot on the serving cell. The second MCS index table $MCST_2$ is associated with PDSCH receptions by the UE in a second SBFD UL subband scheduled by the gNB for DL receptions on the full-duplex or SBFD slot on the serving cell. One motivation is that the gNB can indicate to the UE a first MCS index table for an SBFD DL subband in an SBFD slot and second MCS index table for PDSCH receptions when the provided SBFD UL subband of the SBFD slot is scheduled for DL receptions to UEs such that different link settings due to different antenna & configurations for the SBFD DL and UL subbands can be overcome.

For conciseness of description and without loss of generality, the use of an indicated first and second MCS index table for the first and the second subband of a slot is described in the embodiment of the disclosure for several examples of a first and a second MCS index provided for a first and a second SBFD DL subband in an SBFD slot, but as can be seen by someone skilled in the art, the description generalizes to the case where the indicated first and second MCS index table for the first and the second subband of a slot is provided for a first SBFD DL subband and a second SBFD UL subband in the SBFD slot where the second SBFD UL subband is scheduled by the gNB for DL receptions, or to the case when the indicated first and second MCS index table for the first and the second subband of a slot is provided for a normal DL or S or non-SBFD slot.

An MCS index table may be used by the UE to determine parameters for PDSCH receptions in a number of SBFD DL subbands of a full-duplex or SBFD slot. The parameters may include a modulation order, target code rate, and/or transport block size. The first and second MCS index tables, $MCST_1$ and $MCST_2$, associated with the parameters for PDSCH receptions using different MCS index tables for the different SBFD DL subbands may be provided to the UE by one or a combination of RRC signaling, tabulated and/or listed by system operating specifications, MAC CE signaling, or L1 control signaling by a DCI format. Only a first MCS index table $MCST_1$ associated with PDSCH receptions in a first SBFD DL subband may be provided to the UE by RRC signaling and a second MCS index table $MCST_2$ for the PDSCH receptions in a second SBFD DL subband may be determined by the UE from, e.g., MAC CE, DCI format, or system specifications.

The determination of a second MCS index table $MCST_2$ for PDSCH receptions in the second SBFD DL subband by the UE may depend on and be a function of a first provided MCS index table $MCST_1$ of the first SBFD DL subband, e.g., the UE determines $MCST_2$ by association with $MCST_1$. The first or the second MCS index tables, $MCST_1$ or $MCST_2$, associated with PDSCH receptions in the first and second SBFD DL subbands of a full-duplex or SBFD slot on a serving cell, respectively, may be provided to or signaled to the UE by means of index values $I_{MCST,1}$ and $I_{MCST,2}$ respectively. Different slots may be indicated to be associates with different MCS index tables for the first and second SBFD DL subbands, e.g., the MCS index table indicated for the first SBFD DL subband in a full-duplex or SBFD slot may be same as the MCS index table for the first SBFD DL subband in another full-duplex or SBFD slot, or they may be indicated using different settings. Similar considerations apply to the MCS index tables indicated for the second SBFD DL subband in a full duplex or SBFD slot and another full-duplex or SBFD slot.

The UE may determine parameters for PDSCH receptions in a SBFD DL subband of a full-duplex or SBFD slot using either the first or the second MCS index table, $MCST_1$ or $MCST_2$, after determining that the slot type is full-duplex or SBFD. The parameters for PDSCH receptions may include a modulation order, target code rate, and/or transport block size. A UE may use the first and second MCS index tables, $MCST_1$ and $MCST_2$, to determine parameters for PDSCH receptions in a first SBFD DL subband and in a second SBFD DL subband, respectively, of a full-duplex or SBFD slot. The UE may determine the parameters for PDSCH receptions in a SBFD DL subband of a full-duplex or SBFD slot selecting from the first and second MCS index tables, $MCST_1$ and $MCST_2$, provided for the SBFD DL subbands using an indicated or specified condition.

FIG. 13 illustrates an example of PDSCH reception with a first and a second MCS index table 1300 according to embodiments of the present disclosure. An embodiment of the PDSCH reception with a first and a second MCS index table 1300 shown in FIG. 13 is for illustration only.

As shown in FIG. 13, a first and a second SBFD DL subband is configured for the full-duplex or SBFD slots, e.g., slots 1 and 2, where slots are numbered from 0 to 4. The UE determines a first MCS index table $MCST_1$ for DL subband 1 and a second MCS index table $MCST_2$ for SBFD DL subband 2. For example, the UE determines the first MCS index table $MCST_1$ based in RRC signaling using messages such as RRCSetup or RRCReconfiguration or IEs included therein. The UE determines the second MCS index table $MCST_2$ from RRC signaling using messages such as RRCSetup or RRCReconfiguration or IEs included therein. In another example, the UE may determine the first MCS index table $MCST_1$ associated with PDSCH reception in SBFD DL subband 1 from RRC signaling and determine the second MCS index table $MCST_2$ for PDSCH reception in SBFD DL subband 2 of the full-duplex slot in a serving cell based on a signaled index value $I_{MCST,2}$ provided by the DCI format 1_0, 1_1 or 1_2 scheduling the PDSCH reception.

Several solutions for determination by the UE of the first and second MCS index tables, $MCST_1$ and $MCST_2$, associated with PDSCH receptions in the first and the second SBFD DL subbands, respectively, are described in the disclosure. In the example of FIG. 9, when the UE is scheduled a PDSCH reception in full-duplex or SBFD slot 1, the UE determines the parameters associated with the PDSCH reception in SBFD DL subband 1 using MCS index table $MCST_1$ when the PDSCH reception is in full-duplex or SBFD slot 1. The UE determines the parameters associated with the PDSCH reception in SBFD DL subband 2 using the MCS index table $MCST_2$ when the PDSCH reception is in full-duplex or SBFD slot 2. The parameters may include a modulation order, target code rate, and/or transport block size. For example, the configured MCS index table $MCST_1$ for PDSCH receptions in SBFD DL subband 1 or 2 may correspond to a MCS index tables 1, 2, 3 or 4 as provided by tables as illustrated in 3GPP standard specification.

A frequency-occupancy of a SBFD DL subband, e.g., a start/first RB and a size of the SBFD DL subband indicated in a first full-duplex or SBFD slot may be same or different as a frequency-occupancy of the SBFD DL subband in a second full-duplex or SBFD slot. When a slot is configured for DL only, or when a slot is configured for full-duplex or SBFD and is used only transmissions from a serving gNB, a default rule may apply. For example, a UE may assume an indicated MCS index table for determining parameters for PDSCH receptions in SBFD DL subband 1. Alternatively, the UE may assume an MCS index table that is indicated by RRC signaling using a list or priority order. In yet another alternative, the UE may assume an MCS index table indicated by RRC signaling for PDSCH receptions in a normal DL or non-SBFD slot.

Using first and second MCS index tables, $MCST_1$ and $MCST_2$, for scheduling PDSCH receptions to a UE in the first and second SBFD DL subbands, respectively, of a full-duplex or SBFD slot on a serving cell, the modulation order, target code rate, and/or transport block size can be set and adjusted for separately by the gNB for the UE in the full-duplex or SBFD slots. For example, the gNB may configure a first MCS index table $MCST_1$ "qam64" for the UE when scheduling PDSCH receptions using the SBFD DL subband 1 in the full-duplex or SBFD slot and may configure a second MCS index table $MCST_2$ with "qam64lowSE" in the SBFD DL subband 2 for the UE to adjust for worse DL link conditions experienced by the UE in the full-duplex or SBFD slot due to UL-DL interference or gNB-side SIC constraints.

For a PDSCH reception in a full-duplex or SBFD slot, the UE can adjust the receiver processing accordingly because the first and second MCS index tables $MCST_1$ and $MCST_2$ for the PDSCH reception in the SBFD DL subbands of a full-duplex or SBFD slot are known to the UE. The gNB can use measurements obtained by the gNB and/or reported by the UE to determine the link adaptation settings for the UE in the SBFD DL subbands of the full-duplex or SBFD slots. For example, the gNB can use measurements based on receptions of SRS transmitted from UEs and/or measurements reported from UEs using the cross-link interference management reporting feature to determine a link adaptation setting in a SBFD DL subband of a full-duplex or SBFD slot when selecting the MCS index table for a scheduled PDSCH reception by the UE in DL subband 1 or 2.

Figure 14:
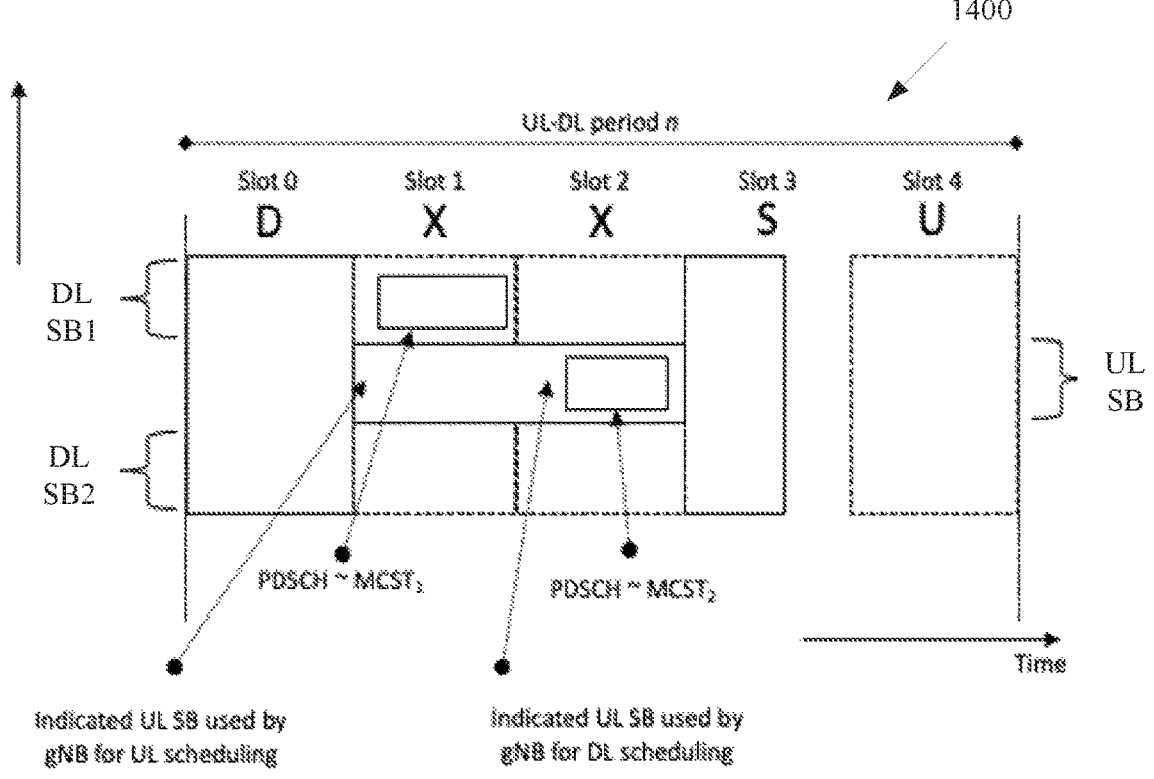
FIG. 14 illustrates another example of PDSCH reception with a first and a second MCS index table according to embodiments of the present disclosure.

FIG. 14 illustrates another example of PDSCH reception with a first and a second MCS index table 1400 according to embodiments of the present disclosure. An embodiment of the PDSCH reception with a first and a second MCS index table 1400 shown in FIG. 14 is for illustration only.

As shown in FIG. 14, a first SBFD DL subband and a second SBFD UL subband is configured for the full-duplex or SBFD slots, e.g., slots 1 and 2, where slots are numbered from 0 to 4. The UE determines a first MCS index table $MCST_1$ for SBFD DL subband 1 and a second MCS index table $MCST_2$ for the SBFD UL subband in the SBFD slot where the second MCS index table $MCST_2$ is provided to the UE for the case that the SBFD UL subband is scheduled by the gNB for DL receptions by the UE. For example, the UE determines the first and second MCS index table $MCST_1$ or $MCST_2$ based on RRC signaling using messages, by MAC CE or based on signal value(s) provided by the DCI format 1_0, 1_1 or 1_2 scheduling the PDSCH reception as described in the disclosure.

In the example of FIG. 14, when the UE is scheduled a PDSCH reception in full-duplex or SBFD slot 1, the UE determines the parameters associated with the PDSCH reception in SBFD DL subband 1 using MCS index table $MCST_1$ when the PDSCH reception is in full-duplex or SBFD slot 1. The UE determines the parameters associated with the PDSCH reception in the SBFD UL subband of the full-duplex or SBFD slot 2 using the MCS index table $MCST_2$ when the PDSCH reception is in full-duplex or SBFD slot 2. The parameters may include a modulation order, target code rate, and/or transport block size. For example, the indicated MCS index table $MCST_1$ for PDSCH receptions in SBFD DL subband 1 or the indicated MCS index table $MCST_2$ for PDSCH reception in the SBFD UL subband when scheduled for DL reception by the gNB may correspond to a MCS index tables 1, 2, 3 or 4 as provided by tables as illustrated in 3GPP standard specification.

A frequency-occupancy of an SBFD DL or UL subband, e.g., a start/first RB and a size of the SBFD DL or UL subband indicated in a first full-duplex or SBFD slot may be same or different as a frequency-occupancy of the SBFD DL or UL subband in a second full-duplex or SBFD slot. When a slot is configured for DL only, or when a slot is configured for full-duplex and is used only transmissions from a serving gNB, a default rule may apply. For example, a UE may assume an indicated MCS index table for determining parameters for PDSCH receptions in the first SBFD DL subband or the SBFD UL subband. Alternatively, the UE may assume an MCS index table that is indicated by RRC signaling using a list or priority order. In yet another alternative, the UE may assume an MCS index table indicated by RRC signaling for PDSCH receptions in a normal DL or non-SBFD slot.

In one example a first or a second MCS index table, $MCST_1$ or $MCST_2$, associated with parameters for PDSCH receptions in the first and second SBFD DL subbands is provided to the UE by higher layers, e.g., by RRC signaling.

For determination of the modulation order, target code rate and/or TB size using the information field "Modulation and coding scheme" in the DCI format scheduling a PDSCH reception in an SBFD DL subband of the full-duplex or SBFD slot, the UE may be configured with any MCS index table provided by 3GPP standard specification such as the MCS index tables 1-4 of type "qam64," "qam256," "qam64LowSE," or "qam1024," or a new MCS table may be provided to the UE. The UE may be provided by higher layer signaling a minimum required, and/or a maximum allowed, MCS index value for PDSCH reception in an SBFD DL subband of a full-duplex or SBFD slot, e.g., a threshold value for a minimum or maximum MCS setting may be provided to the UE.

A motivation is to allow for link adaptation settings in a SBFD DL subband of a full-duplex or SBFD slot that is controlled through a higher layer provided parameter to not exceed a given limit or range of possible MCS assignments in order to control DL interference and gNB-side SIC in a full-duplex slot. The UE knows the scheduled MCS indexes and can determine the resulting modulation order, targeted coding rate and/or TB size in presence of a configured minimum required and/or maximum allowed MCS index setting for PDSCH receptions in a SBFD DL subband of a full-duplex or SBFD slot and therefore the UE can adjust the receiver processing accordingly.

A UE may be provided with an MCS index table $MCST_1$ or $MCST_2$ for an SBFD DL subband of a full-duplex or SBFD slot by RRC signaling that may be included in one or more messages and/or IEs. For example, and without loss of generality, the parameter indicating an MCS index table $MCST_1$ or $MCST_2$ may be signaled from the gNB to the UE as part of RRC messages of type RRCSetup, RRCReconfiguration, SIB1 or SystemInformation and may be included in RRC IEs of type ServingCellConfig, ServingCellConfig-Common, or ServingCellConfigSIB1. Such RRC configuration parameters may be of enumerated, listed or sequence type and/or may be encoded as a bit string.

In one example, the parameter indicating MCS index table $MCST_1$ or $MCST_2$ may be included in an information element of type PDSCH-TimeDomainResourceAllocation. The example can be generalized to include the possibility of providing multiple configured MCS index table parameters $MCST_1$ or $MCST_2$ for multi-slot PDSCH allocation when assigning different MCS index table values to different row indexes where the slot occurs in the PDSCH-TimeDomain-ResourceAllocation table.

As can be seen by someone skilled-in-the-art, solutions exemplified for the case of DL scheduling using dynamic grants extend to the case of DL scheduling using semi-persistent scheduling (SPS). For PDSCH receptions with SPS, the parameters for the PDSCH reception are indicated by higher layer configuration as described by 3GPP standard specification, and a DL assignment received on the DCI. For example, when using SPS for PDSCH reception, the MCS index table can be indicated by higher layer parameter SPS-Config using the mcs-table IE. Solutions and examples described to provide a first and a second MCS index table, $MCST_1$ and $MCST_2$, for PDSCH receptions using SPS on a serving cell and associated with a first or a second subband in a slot can be applied with suitable modifications, e.g., providing the corresponding IEs or fields and indications for the first and second MCS index tables provided for SPS using the higher layer parameter SPS-Config and mcs-table1 and mcs-table2 IEs.

A motivation is that the slot type or the subband, e.g., the RB allocation, of the PDSCH reception using SPS may vary. For example, the first or the second SBFD DL subband of an SBFD slot may be used for the PDSCH reception depending on the field "Frequency domain resource assignment" in the DCI scheduling activation of SPS. In another example, an SBFD slot using an SBFD DL subband or the normal DL (or S) non-SBFD slot may be used for SPS depending on the periodicity of the SPS reception. An MCS index table suitable to the characteristics of the slot type and subband characteristics may then be indicated to the UE provided with SPS for a same SPS configuration when two MCS index tables can be provided for different subbands in a slot or for subbands in different slot types, e.g., for a SBFD slot and a normal DL (or S) non-SBFD slot respectively. Note that retransmissions for SPS are scheduled by DCI that uses CS-RNTI.

FIG. 15 illustrates a flowchart of UE operation 1500 for PDSCH reception according to embodiments of the present disclosure. The UE operation 1500 as may be performed by a UE (e.g., 111-116 as illustrated in FIG. 1). An embodiment of the UE operation 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

As illustrated in FIG. 15, the UE is provided first and second MCS index tables, $MCST_1$ and $MCST_2$, associated with parameters for PDSCH receptions in first and second SBFD DL subbands, respectively, of a full-duplex slot. When the UE receives a DCI format scheduling a PDSCH reception in a slot, the UE selects the applicable MCS index table for the PDSCH reception from the set of first or second MCS index tables $MCST_1$ and $MCST_2$ associated with the SBFD DL subband 1 and 2 respectively in the slot based on the frequency-domain resource allocation of the PDSCH reception indicated by the DCI format. The UE determines the modulation order ($Q_m$) and target code rate (R) for the PDSCH reception using the MCS index table associated with the SBFD DL subband of the slot and using the indication by the MCS field ($I_{MCS}$) in the DCI format.

As illustrated in FIG. 15, in step 1502, a UE is provided by RRC with $MCST_1$ and $MCST_2$ and their associated SBFD DL subband(s). In step 1504, the UE receives the DL grant DCI scheduling PDSCH in slot n. In step 1506, the UE determines the index $I_{MCS}$ of the DL grant DCI. In step 1508, the UE determines the FDRA indicated by the DL grant DCI. In step 1510, the UE selects one of the first or the second MCS index table $MCS_1$ or $MCST_2$ based on the FDRA. In step 1512, the UE determines modulation order, target code rate and/or TB size using the selected MCS index table and using $I_{MCS}$. In step 1514, the UE receives PDSCH in slot n using the determined DL transmission parameters.

In one example, a first or a second MCS index table $MCST_1$ or $MCST_2$ associated with parameters for PDSCH receptions in different SBFD DL subbands of a full-duplex or SBFD slot may be provided to the UE by system operating specifications, e.g., tabulated and/or listed.

For example, the first MCS index table $MCST_1$ may be provided to the UE by RRC signaling, and the UE determines a second MCS index table $MCST_2$ by selecting a value from a set of tabulated or listed values provided by system specifications. The first signaled MCS index table and the second provided MCS index table may be separate and allow for independent settings of the first or the second MCS index table $MCST_1$ and $MCST_2$ associated with the parameters of the PDSCH reception in the first or the second SBFD DL subband, respectively, of a full-duplex or SBFD slot. The second provided MCS index table may be used together with the first signaled MCS index table to determine a resulting MCS value.

In one embodiment, the UE determines first and second MCS index tables, $MCST_1$ and $MCST_2$, for a PUSCH transmission in a serving cell. In one example, the first MCS index table $MCST_1$ for a serving cell is associated with PUSCH transmissions by the UE in a first SBFD UL subband of a full-duplex or SBFD slot on the serving cell. The second MCS index table $MCST_2$ is associated with PUSCH transmissions by the UE in a second SBFD UL subband of the full-duplex or SBFD slot on the serving cell. One motivation is that the gNB can indicate to the UE the use of different MCS index tables for the first and the second SBFD UL subbands in the SBFD slot respectively to account for different link gains and transmission power constraints.

In another example, the first MCS index table $MCST_1$ for a serving cell is associated with PUSCH transmissions by the UE in a first SBFD UL subband of a full-duplex or SBFD slot on the serving cell. The second MCS index table $MCST_2$ is associated with PUSCH transmissions by the UE in a second SBFD DL subband scheduled for UL transmission on the full-duplex or SBFD slot on the serving cell. One motivation is that the gNB can indicate to the UE a first MCS index table for an SBFD UL subband in a SBFD slot and second MCS index table for PUSCH transmissions when the provided SBFD DL subband of the SBFD slot is scheduled for UL transmissions from UEs such that different link settings due to different antenna & configurations for the SBFD UL and DL subbands can be overcome.

For conciseness of description and without loss of generality, the use of an indicated first and second MCS index table for the first and the second subband of a slot is described in the embodiment of the disclosure for several examples of a first and a second MCS index provided for a first and a second SBFD UL subband in a SBFD slot, but as can be seen by someone skilled in the art, the description generalizes to the case where the indicated first and second MCS index table for the first and the second subband of a slot is provided for a first SBFD UL subband and a second SBFD DL subband in the SBFD slot where the second SBFD DL subband is scheduled by the gNB for UL transmission, or to the case when the indicated first and second MCS index table for the first and the second subband of a slot is provided for a normal UL slot.

An MCS index table may be used by the UE to determine parameters for PUSCH transmissions in a number of SBFD UL subbands of a full-duplex or SBFD slot. The parameters may include a modulation order, target code rate, and/or transport block size. The first and second MCS index tables, $MCST_1$ and $MCST_2$, associated with the parameters for PUSCH transmissions using different MCS index tables for the different SBFD UL subbands may be provided to the UE by one or a combination of RRC signaling, tabulated and/or listed by system operating specifications, MAC CE signaling, or L1 control signaling by a DCI format. Only a first MCS index table $MCST_1$ associated with PUSCH transmissions in a first SBFD UL subband may be provided to the UE by RRC signaling and a second MCS index table $MCST_2$ for the PUSCH transmissions in a second SBFD UL subband may be determined by the UE from, e.g., MAC CE, DCI format, or system specifications.

The determination of a second MCS index table $MCST_2$ for PUSCH transmissions in the second SBFD UL subband by the UE may depend on and be a function of a first provided MCS index table $MCST_1$ of the first SBFD UL subband, e.g., the UE determines $MCST_2$ by association with $MCST_1$. The first or the second MCS index tables, $MCST_1$ or $MCST_2$, associated with PUSCH transmissions in the first and second SBFD UL subbands of a full-duplex or SBFD slot on a serving cell, respectively, may be provided to or signaled to the UE by means of index values $I_{MCST,1}$ and $I_{MCST,2}$ respectively.

Different slots may be indicated to be associates with different MCS index tables for the first and second SBFD UL subbands, e.g., the MCS index table indicated for the first SBFD UL subband in a full-duplex or SBFD slot may be same as the MCS index table for the first SBFD UL subband in another full-duplex or SBFD slot, or they may be indicated using different settings. Similar considerations apply to the MCS index tables indicated for the second SBFD UL subband in a full duplex or SBFD slot and another full-duplex or SBFD slot.

The UE may determine parameters for PUSCH transmissions in an SBFD UL subband of a full-duplex or SBFD slot using either the first or the second MCS index table, $MCST_1$ or $MCST_2$, after determining that the slot type is full-duplex or SBFD. The parameters for PUSCH transmissions may include a modulation order, target code rate, and/or transport block size. A UE may use the first and second MCS index tables, $MCST_1$ and $MCST_2$, to determine parameters for PUSCH transmissions in a first SBFD UL subband and in a second SBFD UL subband, respectively, of a full-duplex or SBFD slot. The UE may determine the parameters for PUSCH transmissions in an SBFD UL subband of a full-duplex or SBFD slot selecting from the first and second MCS index tables, $MCST_1$ and $MCST_2$, provided for the SBFD UL subbands using an indicated or specified condition.

Figure 16:
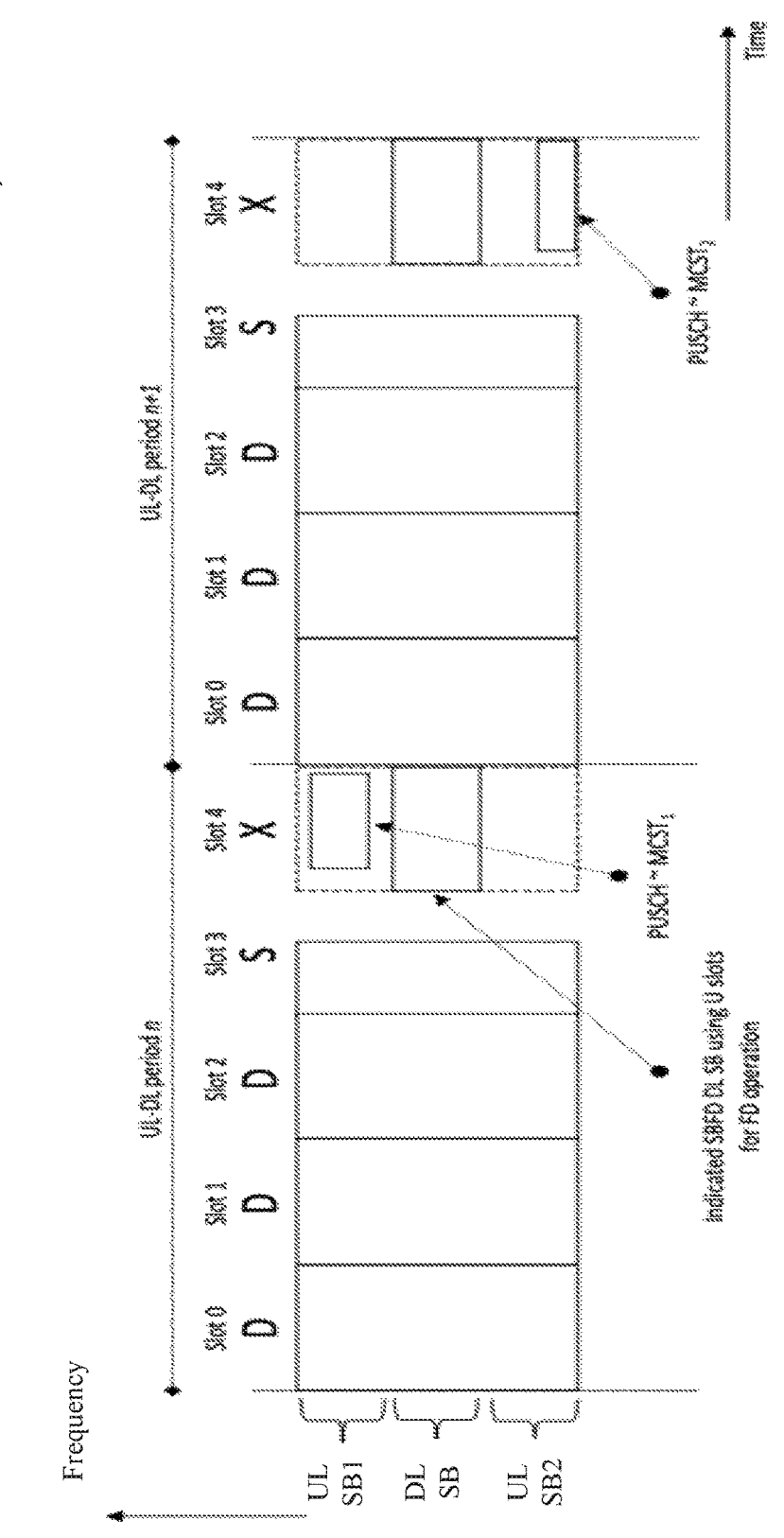
FIG. 16 illustrates an example of PUSCH transmission with a first and a second MCS index table according to embodiments of the present disclosure.

FIG. 16 illustrates an example of PUSCH transmission with a first and a second MCS index table 1600 according to embodiments of the present disclosure. An embodiment of the PUSCH transmission with a first and a second MCS index table 1600 shown in FIG. 16 is for illustration only.

As shown in FIG. 16, a first and a second SBFD UL subband is configured for the full-duplex or SBFD slot, e.g., slot 4, where slots are numbered from 0 to 4. The UE determines a first MCS index table $MCST_1$ for SBFD UL subband 1 for slot 4 of UL-DL period n and a second MCS index table $MCST_2$ for SBFD UL subband 2 for slot 4 of UL-DL period n+1. For example, the UE determines the first MCS index table $MCST_1$ based on RRC signaling using messages such as RRCSetup or RRCReconfiguration or IEs included therein. The UE determines the second MCS index table $MCST_2$ from RRC signaling using messages such as RRCSetup or RRCReconfiguration or IEs included therein.

In another example, the UE may determine the first MCS index table $MCST_1$ associated with PUSCH transmission in SBFD UL subband 1 from RRC signaling and determine the second MCS index table $MCST_2$ for PUSCH transmission in SBFD UL subband 2 of the full-duplex or SBFD slot in a serving cell based on a signaled index value $I_{MCST,2}$ provided by the DCI format 0_0, 0_1 or 0_2 scheduling the PUSCH transmission. Several solutions for determination by the UE of the first and second MCS index tables, $MCST_1$ and $MCST_2$, associated with PUSCH transmissions in the first and the second SBFD UL subbands, respectively, are described in the disclosure. In the example of FIG. 12, when the UE is scheduled a PUSCH transmission in full-duplex or SBFD slot 4, the UE determines the parameters associated with the PUSCH transmission in SBFD UL subband 1 using MCS index table $MCST_1$ when the PUSCH transmission is in full-duplex or SBFD slot 1.

The UE determines the parameters associated with the PUSCH transmission in SBFD UL subband 2 using the MCS index table $MCST_2$ when the PUSCH transmission is in full-duplex or SBFD slot 2. The parameters may include a modulation order, target code rate, and/or transport block size. For example, the MCS index table $MCST_1$ may correspond to a MCS index tables provided by 3GPP standard specification; or may correspond to the MCS index table for PUSCH with transform precoding and 64QAM provided by table as illustrated in 3GPP standard specification or the MCS index table for PUSCH with transform precoding and 64QAM provided by table as illustrated in 3GPP standard specification.

A frequency-occupancy of an SBFD UL subband, e.g., a start/first RB and a size of the SBFD UL subband indicated in a first full-duplex or SBFD slot may be same or different as a frequency-occupancy of the SBFD UL subband in a second full-duplex or SBFD slot. When a slot is configured for UL only, or when a slot is configured for full-duplex or SBFD and is used only for receptions by the serving gNB, a default rule may apply. For example, a UE may assume an indicated MCS index table for determining parameters for PUSCH transmissions in SBFD UL subband 1. Alternatively, the UE may assume an MCS index table that is indicated by RRC signaling using a list or priority order. In yet another alternative, the UE may assume an MCS index table indicated by RRC signaling for PUSCH transmissions in a normal UL slot.

Using first and second MCS index tables, $MCST_1$ and $MCST_2$, for scheduling PUSCH transmissions to a UE in the first and second SBFD UL subbands, respectively, of a full-duplex or SBFD slot on a serving cell, the modulation order, target code rate, and/or transport block size can be set and adjusted for separately by the gNB for the UE in the full-duplex or SBFD slots. For example, the gNB may configure a first MCS index table $MCST_1$ "qam64" for the UE when scheduling PUSCH transmissions using the SFBD UL subband 1 in the full-duplex or SBFD slot and may configure a second MCS index table $MCST_2$ with "qam64lowSE" in the SBFD UL subband 2 for the UE to adjust for worse UL link conditions experienced by the UE in the full-duplex or SBFD slot due to inter-gNB interference or gNB-side SIC constraints.

For a PUSCH transmission in a full-duplex or SBFD slot, the UE can adjust the receiver processing accordingly because the first and second MCS index tables $MCST_1$ and $MCST_2$ for the PUSCH transmission in the SBFD UL subbands of a full-duplex or SBFD slot are known to the UE. The gNB can use measurements obtained by the gNB and/or reported by the UE to determine the link adaptation settings for the UE in the SBFD UL subbands of the full-duplex or SBFD slots. For example, the gNB can use measurements based on receptions of SRS transmitted from UEs and/or measurements reported from UEs using the cross-link interference management reporting feature to determine a link adaptation setting in an SBFD UL subband of a full-duplex or SBFD slot when selecting the MCS index table for a scheduled PUSCH transmission by the UE in UL subband 1 or 2.

Figure 17:
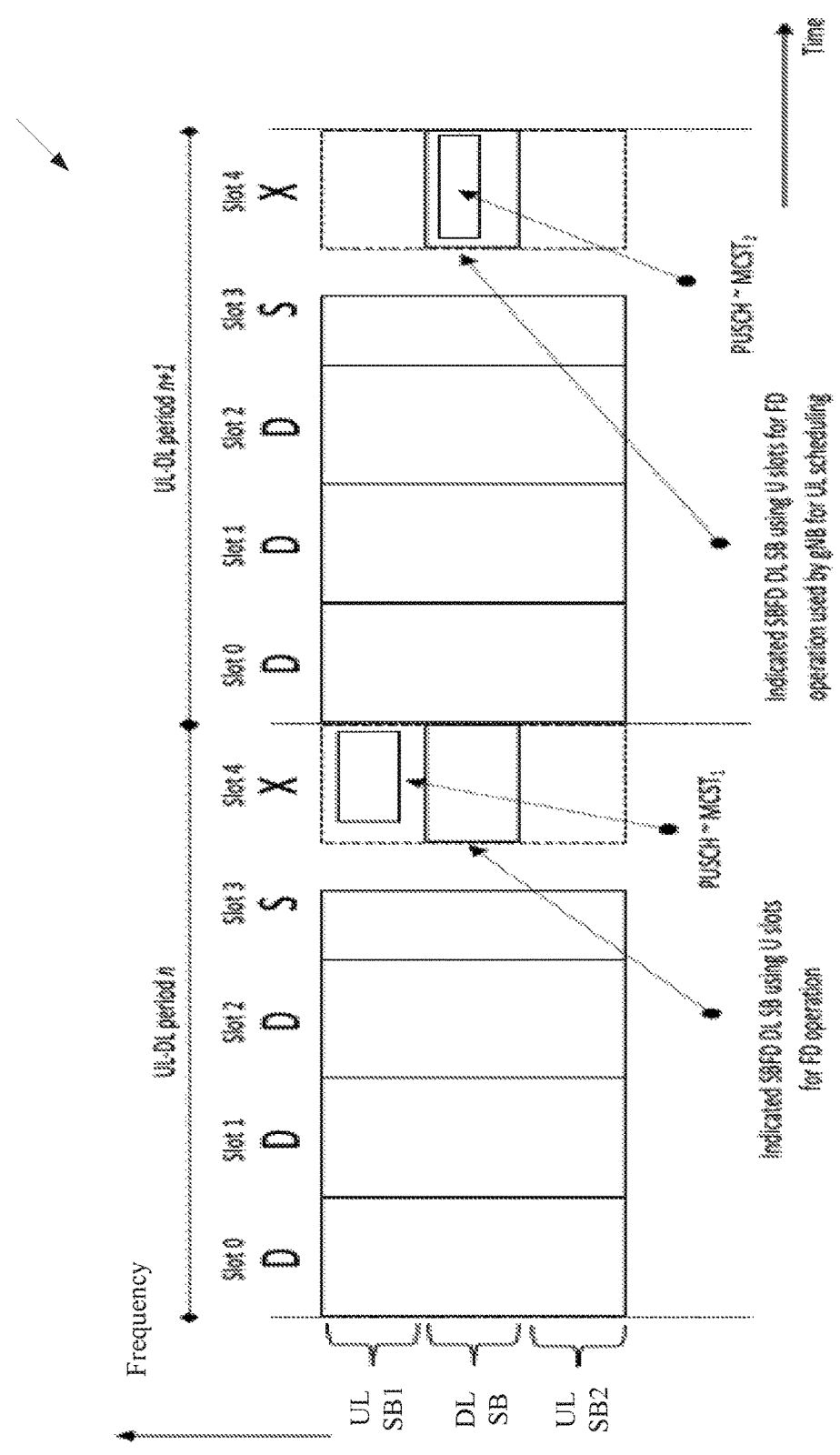
FIG. 17 illustrates another example of PUSCH transmission with a first and a second MCS index table according to embodiments of the present disclosure.

FIG. 17 illustrates another example of PUSCH transmission with a first and a second MCS index table 1700 according to embodiments of the present disclosure. An embodiment of the PUSCH transmission with a first and a second MCS index table 1700 shown in FIG. 17 is for illustration only.

As shown in FIG. 17, a first SBFD UL subband and a second SBFD DL subband is configured for the full-duplex or SBFD slot, e.g., slot 4, where slots are numbered from 0 to 4. The UE determines a first MCS index table $MCST_1$ for SBFD UL subband 1 in slot 4 of UL-DL period n and a second MCS index table $MCST_2$ for the SBFD DL subband in the FD slot 4 of UL-DL period n+1 where the second MCS index table $MCST_2$ is provided to the UE for the case that the SBFD DL subband is scheduled by the gNB for UL transmissions by the UE. For example, the UE determines the first and second MCS index table $MCST_1$ or $MCST_2$ based on RRC signaling using messages, by MAC CE or based on signal value(s) provided by the DCI format 0_0, 0_1 or 0_2 scheduling the PUSCH transmission as described in the disclosure.

In the example of FIG. 17, when the UE is scheduled a PUSCH transmission in full-duplex slot 4, the UE determines the parameters associated with the PUSCH transmission using MCS index table $MCST_1$ when the PUSCH transmission is in the first SBFD UL subband. The UE determines the parameters associated with the PUSCH transmission in the full-duplex or SBFD slot 4 using the MCS index table $MCST_2$ when the PUSCH transmission is scheduled in the second SBFD DL subband. The parameters may include a modulation order, target code rate, and/or transport block size. For example, the indicated MCS index table $MCST_1$ for PUSCH transmissions in SBFD UL subband 1 or the indicated MCS index table $MCST_2$ for PUSCH transmissions in the SBFD DL subband when scheduled for UL transmission by the gNB may correspond to a MCS index tables as provided by tables as illustrated in 3GPP standard specification; or may correspond to the MCS index table for PUSCH with transform precoding and 64QAM provided by table as illustrated in 3GPP standard specification or the MCS index table for PUSCH with transform precoding and 64QAM provided by table as illustrated in 3GPP standard specification.

A frequency-occupancy of a SBFD UL or DL subband, e.g., a start/first RB and a size of the SBFD UL or DL subband indicated in a first full-duplex or SBFD slot may be same or different as a frequency-occupancy of the SBFD UL or DL subband in a second full-duplex or SBFD slot. When a slot is configured for UL only, or when a slot is configured for full-duplex and is used only for receptions by a serving gNB, a default rule may apply. For example, a UE may assume an indicated MCS index table for determining parameters for PUSCH transmissions in the first SBFD UL subband or the SBFD DL subband. Alternatively, the UE may assume an MCS index table that is indicated by RRC signaling using a list or priority order. In yet another alternative, the UE may assume an MCS index table indicated by RRC signaling for PUSCH transmissions in a normal UL slot.

In one example a first or a second MCS index table, $MCST_1$ or $MCST_2$, associated with parameters for PUSCH transmissions in the first and second subband is provided to the UE by higher layers, e.g., by RRC signaling.

For determination of the modulation order, target code rate and/or TB size using the information field "Modulation and coding scheme" in the DCI format scheduling a PUSCH transmission in a subband of the full-duplex or SBFD slot, the UE may be configured with any MCS index table provided by 3GPP standard specification such as MCS index tables as provided by tables as illustrated in 3GPP standard specification; or MCS index table for PUSCH with transform precoding and 64QAM as illustrated in 3GPP standard specification or the MCS index table for PUSCH with transform precoding and 64QAM provided by table as illustrated in 3GPP standard specification, or a new MCS table may be provided to the UE.

The UE may be provided by higher layer signaling a minimum required, and/or a maximum allowed, MCS index value for PUSCH transmission in a subband of a full-duplex or SBFD slot, e.g., a threshold value for a minimum or maximum MCS setting may be provided to the UE. A motivation is to allow for link adaptation settings in an SBFD UL subband of a full-duplex or SBFD slot that is controlled through a higher layer provided parameter to not exceed a given limit or range of possible MCS assignments in order to adjust for inter-gNB interference and gNB-side SIC in a full-duplex slot. The UE knows the scheduled MCS indexes and can determine the resulting modulation order, targeted coding rate and/or TB size in presence of a configured minimum required and/or maximum allowed MCS index setting for PUSCH transmissions in a subband of a full-duplex or SBFD slot and therefore the UE can adjust the receiver processing accordingly.

A UE may be provided with an MCS index table $MCST_1$ or $MCST_2$ for an SBFD UL subband of a full-duplex or SBFD slot by RRC signaling that may be included in one or more messages and/or IEs. For example, and without loss of generality, the parameter indicating an MCS index table $MCST_1$ or $MCST_2$ may be signaled from the gNB to the UE as part of RRC messages of type RRCSetup, RRCReconfiguration, SIB1 or SystemInformation and may be included in RRC IEs of type ServingCellConfig, ServingCellConfigCommon, or ServingCellConfigSIB1. Such RRC configuration parameters may be of enumerated, listed or sequence type and/or may be encoded as a bit string.

In one example, the parameter indicating MCS index table $MCST_1$ or $MCST_2$ may be included in an information element of type PUSCH-TimeDomainResourceAllocation. The example can be generalized to include the possibility of providing multiple configured MCS index table parameters $MCST_1$ or $MCST_2$ for multi-slot PUSCH allocation when assigning different MCS index table values to different row indexes where the slot occurs in the PUSCH-TimeDomain-ResourceAllocation table.

As can be seen by someone skilled-in-the-art, solutions exemplified for the case of UL scheduling using dynamic grants extend to the case of UL scheduling using configured grants. For Type 1 PUSCH transmission with a configured grant, higher layer provided parameters are applied to indicate the parameters for PUSCH transmissions from the UE. For Type 2 PUSCH transmissions with a configured grant, the parameters for the PUSCH transmission are indicated by higher layer configuration as described by 3GPP standard specification and an UL grant received on the DCI.

For example, when using configured grants for PUSCH transmissions, the MCS index table can be indicated by higher layer parameter configuredGrantConfig in BWP-UplinkDedicated. Solutions and examples described to provide a first and a second MCS index table, $MCST_1$ and $MCST_2$, for PUSCH transmissions using a configured grant on a serving cell and associated with a first SBFD UL subband and with a second SBFD UL subband (or with a SBFD DL subband when using U slots for SBFD) can be applied with suitable modifications, e.g., providing the corresponding IEs or fields and indications for the first and second MCS index tables provided for a CG using the higher layer parameter configuredGrantConfig.

A motivation is that the slot type or the subband, e.g., the RB allocation, of the PUSCH transmission using CG Type 2 may vary. For example, the first or the second SBFD UL subband of the SBFD slot may be used for the PUSCH transmission depending on the field "frequency domain resource assignment" in the DCI scheduling activation of CG Type 2. In another example, a SBFD slot using an SBFD UL subband or the normal UL slot may be used for CG Type 2 depending on the periodicity of the CG transmissions. An MCS index table suitable to the characteristics of the slot type and subband characteristics may then be indicated to the UE provided with CGs for a same CG configuration when two MCS index tables can be provided for different subbands in a slot or for subbands in different slot types, e.g., for a SBFD slot and a normal UL slot respectively. Note that retransmissions for CG are scheduled by DCI that uses CS-RNTI.

FIG. 18 illustrates a flowchart of UE operation 1800 for PDSCH transmission according to embodiments of the present disclosure. The UE operation 1800 as may be performed by a UE (e.g., 111-116 as illustrated in FIG. 1). An embodiment of the UE operation 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

As illustrated in FIG. 18, the UE is provided first and second MCS index tables, $MCST_1$ and $MCST_2$, associated with parameters for PUSCH transmission in first and second SBFD UL subbands, respectively, of a full-duplex or SBFD slot. When the UE receives a DCI format scheduling a PUSCH transmission in a slot, the UE selects the applicable MCS index table for the PUSCH transmission from the set of first or second MCS index tables $MCST_1$ and $MCST_2$ associated with the SBFD UL subband 1 and 2 respectively in the slot based on the frequency-domain resource allocation of the PUSCH transmission indicated by the DCI format. The UE determines the modulation order ($Q_m$) and target code rate (R) for the PUSCH transmission using the MCS index table associated with the SBFD UL subband of the slot and using the indication by the MCS field ($I_{MCS}$) in the DCI format.

As illustrated in FIG. 18, in step 1802, a UE is provided by RRC with $MCST_1$ and $MCST_2$ and their associated first and second subband(s). In step 1804, the UE receives the UL grant DCI scheduling PUSCH in slot n. In step 1806, the UE determines the index $I_{MCS}$ of the UL grant DCI. In step 1808, the UE determines the frequency-domain resource allocation (FDRA) of the UL grant DCI. In step 1810, the UE selects one of the first or the second MCS index table $MCS_1$ or $MCST_2$ for a slot based on the SB associated with the FDRA. In step 1812, the UE determines modulation order, target code rate and/or TB size using the selected MCS index table and using $I_{MCS}$. In step 1814, the UE transmits PDSCH in slot n using the determined DL transmission parameters.

In one example, a first or a second MCS index table $MCST_1$ or $MCST_2$ associated with parameters for PUSCH transmissions in different subbands of a full-duplex or SBFD slot may be provided to the UE by system operating specifications, e.g., tabulated and/or listed.

For example, the first MCS index table $MCST_1$ may be provided to the UE by RRC signaling, and the UE determines a second MCS index table $MCST_2$ by selecting a value from a set of tabulated or listed values provided by system specifications. The first signaled MCS index table and the second provided MCS index table may be separate and allow for independent settings of the first or the second MCS index table $MCST_1$ and $MCST_2$ associated with the parameters of the PUSCH transmission in the first or the second SBFD UL subband, respectively, of a full-duplex or SBFD slot. The second provided MCS index table may be used together with the first signaled MCS index table to determine a resulting MCS value.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for a user equipment (UE) to receive a physical downlink shared channel (PDSCH), the method comprising:

receiving:
first information for a first modulation and coding scheme (MCS) table associated with a first frequency-domain subband in a bandwidth on a cell,
second information for a second MCS table associated with a second frequency-domain subband in the bandwidth on the cell, and third information for a condition, wherein at least one of the first frequency-domain subband and the second frequency-domain subband is one of a first subband full-duplex (SBFD) downlink (DL) subband, a second SBFD DL subband, an SBFD flexible subband, or an SBFD uplink (UL) subband;

determining whether the condition is valid for reception in a slot or symbol; and receiving the PDSCH in the slot or symbol based on:
the first MCS table when the condition is valid, and
the second MCS table when the condition is not valid.

2. The method of claim 1, wherein:

the condition is based on a slot or symbol type, and the condition is valid when the slot or symbol type is one of:
a downlink (DL) type,
a flexible (F) type,
a slot or a symbol not indicated for simultaneous transmission and reception during a same time-domain resource on the cell, or
a slot or a symbol indicated for simultaneous transmission and reception during a same time-domain resource on the cell.

3. The method of claim 1, wherein:

the condition is based on a bandwidth for the PDSCH reception, and the condition is valid when the first frequency-domain subband comprises the bandwidth for the PDSCH reception.

4. The method of claim 1, further comprising:

receiving a physical downlink control channel (PDCCH) that provides a downlink control information (DCI) format, wherein:
the DCI format includes an indicator field with a first value and a second value,
determining whether the condition is valid is based on a value of the indicator field,
the condition is valid when the value of the indicator field indicates the first value, and
the condition is invalid when the value of the indicator field indicates the second value.

5. The method of claim 1, wherein:

the first or second information is associated with a maximum allowed value for a MCS entry value to be valid, the method further comprises receiving a downlink control information (DCI) format that indicates the MCS entry value corresponding to the first or second MCS table, and the MCS entry value is valid when the MCS entry value is not larger than the maximum allowed value.

6. The method of claim 1, wherein:

the first or second information is associated with a minimum required value for a MCS entry value to be valid, the method further comprises receiving a downlink control information (DCI) format that indicates the MCS entry value corresponding to the first or second MCS table, and the MCS entry value is valid when the MCS entry value is not smaller than the minimum required value.

7. A base station comprising:

a transceiver configured to transmit:
first information for a first modulation and coding scheme (MCS) table associated with a first frequency-domain subband in a bandwidth on a cell,

second information for a second MCS table associated with a second frequency-domain subband in the bandwidth on the cell, and third information for a condition, wherein at least one of the first frequency-domain subband and the second frequency-domain subband is one of a first subband full-duplex (SBFD) downlink (DL) subband, a second SBFD DL subband, an SBFD flexible subband, or an SBFD uplink (UL) subband; and a processor operably coupled to the transceiver, the processor configured to determine whether the condition is valid for transmission in a slot or symbol, wherein the transceiver is further configured to transmit a physical downlink shared channel (PDSCH) in the slot or symbol based on:

the first MCS table when the condition is valid, and
the second MCS table when the condition is not valid.

8. The base station of claim 7, wherein:

the condition is based on a slot or symbol type, and
the condition is valid when the slot or symbol type is one of:
a downlink (DL) type,
a flexible (F) type,
a slot or a symbol not indicated for simultaneous transmission and reception during a same time-domain resource on the cell, or
a slot or a symbol indicated for simultaneous transmission and reception during a same time-domain resource on the cell.

9. The base station of claim 7, wherein:

the condition is based on a bandwidth for the PDSCH transmission, and
the condition is valid when the first frequency-domain subband comprises the bandwidth for the PDSCH transmission.

10. The base station of claim 7, wherein:

the transceiver is further configured to transmit a physical downlink control channel (PDCCH) that provides a downlink control information (DCI) format,
the DCI format includes an indicator field with a first value and a second value,
the processor is further configured to determine whether the condition is valid is based on a value of the indicator field,
the condition is valid when the value of the indicator field indicates the first value, and
the condition is invalid when the value of the indicator field indicates the second value.

11. The base station of claim 7, wherein:

the first or second information is associated with a maximum allowed value for a MCS entry value to be valid,
the transceiver is further configured to transmit a downlink control information (DCI) format that indicates the MCS entry value corresponding to the first or second MCS table, and
the MCS entry value is valid when the MCS entry value is not larger than the maximum allowed value.

12. The base station of claim 7, wherein:

the first or second information is associated with a minimum required value for a MCS entry value to be valid,
the transceiver is further configured to transmit a downlink control information (DCI) format that indicates the MCS entry value corresponding to the first or second MCS table, and
the MCS entry value is valid when the MCS entry value is not smaller than the minimum required value.

46

13. A user equipment (UE) comprising:

a transceiver configured to receive:
first information for a first modulation and coding scheme (MCS) table associated with a first frequency-domain subband in a bandwidth on a cell,
second information for a second MCS table associated with a second frequency-domain subband in the bandwidth on the cell, and
third information for a condition, wherein at least one of the first frequency-domain subband and the second frequency-domain subband is one of a first subband full-duplex (SBFD) downlink (DL) subband, a second SBFD DL subband, an SBFD flexible subband, or an SBFD uplink (UL) subband; and a processor operably coupled to the transceiver, the processor configured to determine whether the condition is valid for reception in a slot or symbol, wherein the transceiver is further configured to receive a physical downlink shared channel (PDSCH) in the slot or symbol based on:

the first MCS table when the condition is valid, and
the second MCS table when the condition is not valid.

14. The UE of claim 13, wherein:

the condition is based on a slot or symbol type, and
the condition is valid when the slot or symbol type is one of:
a downlink (DL) type,
a flexible (F) type,
a slot or a symbol not indicated for simultaneous transmission and reception during a same time-domain resource on the cell, or
a slot or a symbol indicated for simultaneous transmission and reception during a same time-domain resource on the cell.

15. The UE of claim 13, wherein:

the condition is based on a bandwidth for the PDSCH reception, and
the condition is valid when the first frequency-domain subband comprises the bandwidth for the PDSCH reception.

16. The UE of claim 13, wherein:

the transceiver is further configured to receive a physical downlink control channel (PDCCH) that provides a downlink control information (DCI) format,
the DCI format includes an indicator field with a first value and a second value,
the processor is further configured to determine whether the condition is valid is based on a value of the indicator field,
the condition is valid when the value of the indicator field indicates the first value, and
the condition is invalid when the value of the indicator field indicates the second value.

17. The UE of claim 13, wherein:

the first or second information is associated with a maximum allowed value for a MCS entry value to be valid,
the transceiver is further configured to receive a downlink control information (DCI) format that indicates the MCS entry value corresponding to the first or second MCS table, and
the MCS entry value is valid when the MCS entry value is not larger than the maximum allowed value.

18. The UE of claim 13, wherein:

the first or second information is associated with a minimum required value for a MCS entry value to be valid, the transceiver is further configured to receive a downlink control information (DCI) format that indicates the MCS entry value corresponding to the first or second MCS table, and the MCS entry value is valid when the MCS entry value is not smaller than the minimum required value.

* * * * *